(12) United States Patent
Miao et al.

(10) Patent No.: US 10,849,170 B2
(45) Date of Patent: Nov. 24, 2020

(54) SIGNALING METHODS FOR FLEXIBLE RADIO RESOURCE MANAGEMENT

(71) Applicant: Apple Inc., Cupertino, CA (US)

(72) Inventors: Honglei Miao, Munich (DE); Gang Xiong, Portland, OR (US); Jong-Kae Fwu, Sunnyvale, CA (US); Michael Faerber, Wolfratshausen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/761,390

(22) PCT Filed: Apr. 1, 2016

(86) PCT No.: PCT/US2016/205492
§ 371 (c)(1),
(2) Date: Mar. 19, 2018

(87) PCT Pub. No.: WO2017/062061
PCT Pub. Date: Apr. 13, 2017

(65) Prior Publication Data
US 2018/0279388 A1   Sep. 27, 2018

Related U.S. Application Data

(60) Provisional application No. 62/239,213, filed on Oct. 8, 2015.

(51) Int. Cl.
*H04W 76/10* (2018.01)
*H04W 72/04* (2009.01)
*H04W 16/02* (2009.01)

(52) U.S. Cl.
CPC .......... *H04W 76/10* (2018.02); *H04W 16/02* (2013.01); *H04W 72/04* (2013.01)

(58) Field of Classification Search
None
See application file for complete search history.

(56) References Cited

U.S. PATENT DOCUMENTS 10,206,205 B2   2/2019   Seo et al.
10,390,236 B2 * 8/2019   Xiong ..................... H04W 4/70
(Continued)

FOREIGN PATENT DOCUMENTS

| CN | 102308494 A | 1/2012 |
|----|-------------|--------|
| CN | 103959682 A | 7/2014 |
| WO | WO 2014070434 A1 | 5/2014 |

OTHER PUBLICATIONS

International Preliminary Report on Patentability for International Patent Application No. PCT/US16/25492), dated Apr. 10, 2018.

(Continued)

*Primary Examiner* — Kenny S Lin
(74) *Attorney, Agent, or Firm* — Sterne, Kessler, Goldstein & Fox P.L.L.C.

(57) ABSTRACT

Described is a User Equipment (UE) comprising one or more processors to generate a transmission to an Evolved Node-B (eNB) listing a service-specific resource partition supported by the UE. The eNB may comprise one or more processors to process the transmission listing the service-specific resource partition from the UE. In response, the one or more processors of the eNB may be further to generate a partition configuration transmission to configure the service-specific resource partition. The one or more processors of the UE may then be further to process the partition configuration transmission.

24 Claims, 16 Drawing Sheets

(56) References Cited

U.S. PATENT DOCUMENTS

| | | | | |
|---|---|---|---|---|
| 2012/0039284 A1* | 2/2012 | Barbieri | | H04W 48/10 |
| | | | | 370/329 |
| 2013/0094411 A1* | 4/2013 | Zhang | | H04L 5/0048 |
| | | | | 370/281 |
| 2013/0136098 A1 | 5/2013 | Li et al. | | |
| 2013/0142139 A1 | 6/2013 | Kitazoe et al. | | |
| 2014/0036813 A1* | 2/2014 | Lunttila | | H04W 72/0413 |
| | | | | 370/329 |
| 2014/0328302 A1* | 11/2014 | Park | | H04L 5/0037 |
| | | | | 370/329 |
| 2014/0334372 A1 | 11/2014 | Vos | | |
| 2015/0078231 A1* | 3/2015 | Bergstrom | | H04W 72/1242 |
| | | | | 370/311 |
| 2015/0188650 A1* | 7/2015 | Au | | H04J 3/1694 |
| | | | | 370/312 |
| 2016/0255616 A1* | 9/2016 | Martin | | H04W 72/048 |
| | | | | 370/330 |
| 2018/0007673 A1* | 1/2018 | Fwu | | H04W 4/70 |
| 2018/0020462 A1* | 1/2018 | Xiong | | H04W 72/1215 |

OTHER PUBLICATIONS

International Search Report and Written Opinion for International Patent Application No. PCT/US2016/025492, dated Jun. 13, 2016.
Huawei et al., "Views on LTE Rel-14", 3rd Generation Partnership Project (3GPP), vol. TSG Ran, Phoenix, AZ, USA, Sep. 14, 2015-Sep. 16, 2015, retrieved from the Internet via http://www.3gpp.org/ftp/meetings_3gpp_sync/ran/docs.
Levanen, Toni et al., "Radio interface evolution towards 5G and enhanced local area communications", IEEE Access, vol. 2, Sep. 17, 2014, pp. 1005-1029.
Chinese Application No. 201680052114.8, Office Action dated Jun. 29, 2020; English Translation from EPO Global Dossier, 16 pages.
Office Action dated Feb. 5, 2020, in Taiwanese Patent Application No. 105128273, 11 pages.

* cited by examiner

SIGNALING METHODS FOR FLEXIBLE RADIO RESOURCE MANAGEMENT

CLAIM OF PRIORITY

The present application is a National Stage Entry of and claims priority to, PCT Application Serial Number PCT/US2016/025492, filed Apr. 1, 2016, entitled "SIGNAL METHODS FOR FLEXIBLE RADIO RESOURCE MANAGEMENT," which claims priority under 35 U.S.C.§ 119(e) to U.S. Provisional Patent Application Ser. No. 62/239,213, filed Oct. 8, 2015, entitled "SIGNAL METHODS FOR FLEXIBLE RADIO RESOURCE MANAGEMENT," both of which are herein incorporated by reference in their entireties.

BACKGROUND

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless system/5th Generation mobile networks (5G) system. A 5G system (or another wireless cellular communication system) may support various services, such as Extremely Mobile Broadband (eMBB), Massive Machine-Type Communication (MMC/mMTC), Ultra-reliable Machine-Type Communication (uMTC), Mission Critical Communication (MCC), Vehicle-to-X communication (V2X, e.g., communication between a vehicle and another entity X), and so forth. Each supported service may target certain Key Performance Indicators (KPIs).

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
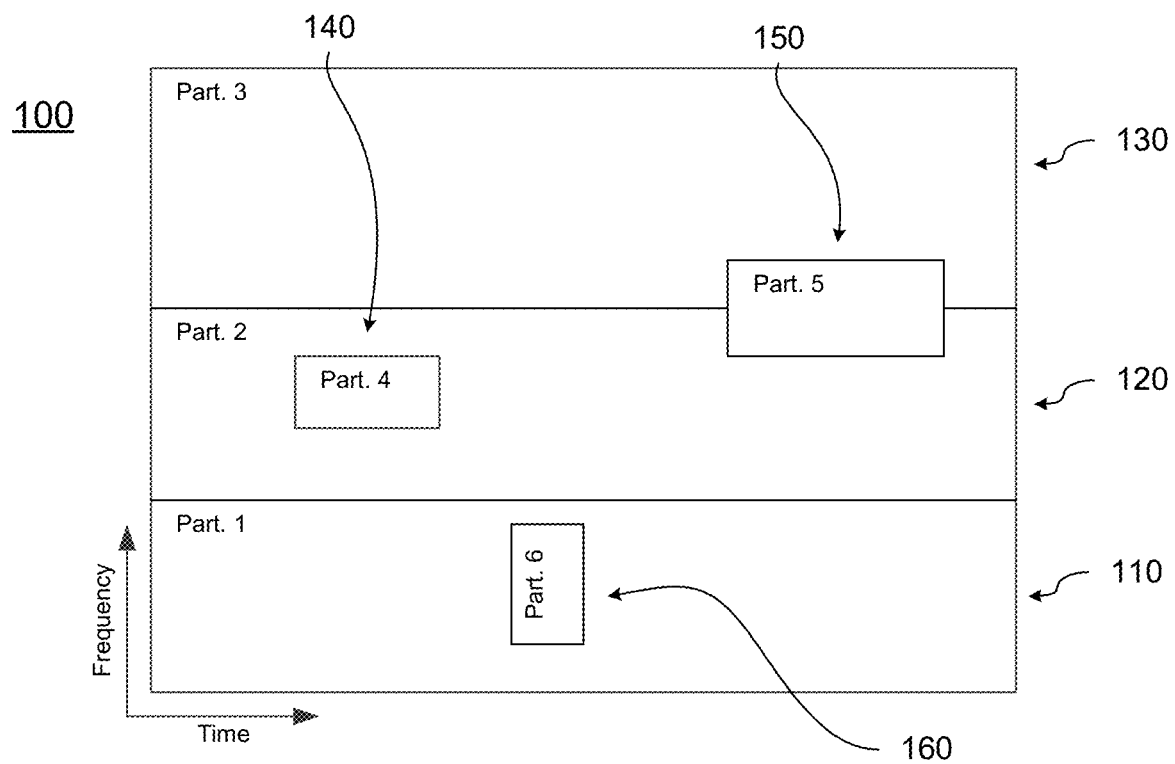
FIG. 1 illustrates a radio resource map having multiple resource partitions, in accordance with some embodiments of the disclosure.

Different radio resources may advantageously be managed in different manners according to different requirements, such as different Key Performance Indicator (KPI) requirements. As an example, a latency-critical service may benefit from a very short Transmission Time Interval (TTI) in order to reduce an air-interface delay. As another example, narrow-band Machine-Type Communication (MTC) for sporadic, small data-packet transmission may benefit from smaller subcarrier spacing and a relatively long TTI.

A flexible radio resource partition framework—e.g., a flexible radio access technology (xRAT)—has been proposed for 5G to help manage radio resources in different manners for different services. Several methods of dynamically signaling radio resource partitions have also been proposed, based primarily on new Master Information Blocks (MIBs), System Information Blocks (SIBs), Radio Resource Control (RRC) signaling, and/or physical channel design. The focus of such proposals has been based more on future-proofing designs, and less on backwards-compatibility.

Meanwhile, various LTE-A specifications are continuing to evolve in order to support different services having different KPIs. For example, further enhanced Carrier Aggregation (CA) of up to 32 component carriers, enhancements for Device-to-Device (D2D) functionality, new physical layer enhancements for MTC, and other features are being developed for the LTE specifications. Moreover, some existing features such as dual- or multi-connectivity, Coordinated Multi-Point (CoMP) functionality, and Enhanced Physical Downlink Control Channel (E-PDCCH) may provide an extensible framework to incorporate numerous potential further improvements.

Discussed below are various methods and mechanisms for implementing enhanced signaling methods through use of features in the existing technological framework. These methods and mechanisms may advantageously improve backward-compatibility while providing for more flexible radio resource partitioning.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Proposed time-frequency resource maps for a 5G system RAT may be divided into different resource partitions or regions targeting different services. The different partitions may be characterized or defined by a numerology comprising a set of physical-layer parameters, including but not limited to: subcarrier spacing; TTI length; various resource-allocation parameters regarding dimension and/or recurrence periodicity in the time and frequency domains (such as a number of Orthogonal Frequency-Division Multiplexing (OFDM) symbols per TTI, a bandwidth per Resource Block (RB), and/or a number of subcarriers per RB); a number of resource elements per RB; corresponding waveforms; and partition-specific numbers of antenna ports and/or antenna beams for supported partitions.

FIG. 1 illustrates a radio resource map having multiple resource partitions, in accordance with some embodiments of the disclosure. Radio resource map 100 may have a time dimension and a frequency dimension, and may periodically recur in the time dimension. Radio resource map 100 may include a first partition 110, a second partition 120, a third partition 130, a fourth partition 140, a fifth partition 150, and a sixth partition 160. First partition 110, second partition 120, and third partition 130 may span portions of the frequency dimension of radio resource map 100 for the entire time dimension, and may accordingly be defined for all times.

In comparison, fourth partition 140, fifth partition 150, and sixth partition 160 may span portions of the frequency dimension of radio resource map 100, but for a subset of the time dimension. As a result, fourth partition 140, fifth partition 150, and sixth partition 160 may merely be defined for certain ranges of time. Since radio resource map 100 may periodically recur in the time dimension, fourth partition 140, fifth partition 150, and sixth partition 160 may also periodically recur in the time dimension.

Each partition may support one or more services. In some embodiments, first partition 110 may support legacy User Equipments (UEs)s with conventional voice and/or data services under legacy LTE operation, and may also support various radio control-plane functions (RRC connection management, security authentication, etc.).

Other partitions may then support various different services, such as user plane data traffic. For example, second partition 120 and third partition 130 may support extremely broadband services having very low latencies. Meanwhile, fourth partition 140, fifth partition 150, and sixth partition 160 may support mMTC services, uMTC services, and V2X services, respectively. These partitions may be non-overlapped, or may be partially overlapped, or may be fully overlapped with each other.

In some embodiments, certain carrier frequencies (such as frequencies below 6 GHz, for example) may comprise a primary partition, and may use a numerology (e.g., parameters for resource allocation, as discussed above) that corresponds to an existing LTE numerology. A secondary partition may then be designed to support other services, such as low latency applications. For example, a secondary partition may support a larger subcarrier spacing, such as a 75 kHz subcarrier spacing.

Figure 2:
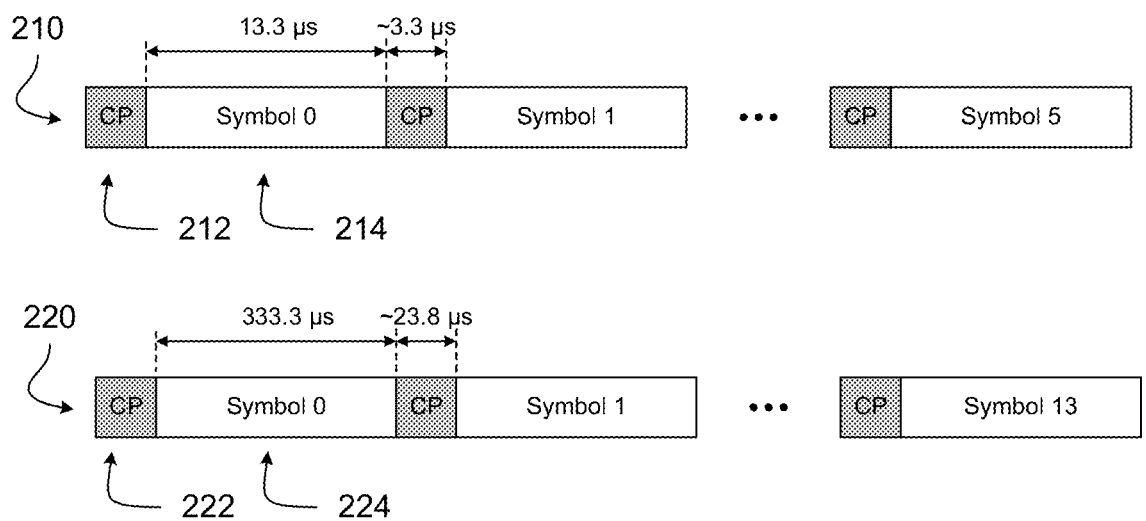
FIG. 2 illustrates subframe structures of example partitions based on Orthogonal Frequency-Division Multiplexing (OFDM) waveforms, in accordance with some embodiments of the disclosure.

FIG. 2 illustrates subframe structures of example partitions based on OFDM waveforms, in accordance with some embodiments of the disclosure. For a first example, a first subframe structure 210 may group six Cyclic Prefixes (CPs) 212 and six OFDM symbols 214 (numbered 0 through 5) within one TTI, with a symbol time of approximately 13.3 us and a CP time of approximately 3.3 us. A sampling rate of approximately 153.6 MHz may support 512 samples. The six CPs and six OFDM symbols may accordingly correspond to a TTI of approximately 0.1 ms.

As a second example, a second subframe structure 220 may be based on a smaller subcarrier spacing (e.g., 3.0 kHz) in order to support MTC services. Second subframe structure 220, which may be a subframe structure for a secondary partition, may group six CPs 222 and fourteen OFDM symbols 224 (numbered 0 through 13) within one TTI. With a symbol time of approximately 333.3 us, and a CP time of approximately 23.8 us, the fourteen CPs and fourteen OFDM symbols may accordingly correspond to a TTI of approximately 5.0 ms.

Various TTIs may be similarly achievable based on these examples. For example, first subframe structure 210 may be extended to group twelve CPs 212 and twelve OFDM symbols 214, which may correspondingly correspond to a TTI of approximately 0.2 ms.

Any particular UE need not be aware of all of the resource partitions supported by radio resource map 100. For example, an MTC device may merely be aware of an MTC specific partition in addition to a control plane Radio Access Technology (RAT). Meanwhile, a UE device with high data consumption need not be aware of any MTC specific partitions. Signaling about resource partition configuration may accordingly performed in a UE-specific manner to reduce system signaling overhead.

Extended Resource Block Definitions

Various supported radio resource formats may be defined in wireless cellular communications standards in order to support flexible radio resource partitioning, which may in turn inherently support various KPIs related to throughput, latency, and reliability. A set of supported TTIs may be approximately 0.2 ms, approximately 1.0 ms, approximately 2.0 ms, and approximately 5.0 ms, and a set of supported subcarrier spacing may be approximately 3.0 kHz, approximately 7.5 kHz, approximately 7.5 kHz, approximately 15 kHz, approximately 75 kHz, approximately 750 kHz, and approximately 1.5 MHz.

Smaller subcarrier spacing such as 3.0 kHz and 7.5 KHz may be advantageously used for MTC with low bandwidth and low power consumption. Larger subcarrier spacing such as 750 kHz and 1.5 MHz may be advantageously used for high-frequency band services, such as services using frequencies above 30 GHz.

A Resource Block (RB) may be defined as a minimum unit for partition allocation. Assuming OFDM-like waveforms in which one time-frequency symbol may be referred to as a resource element, Tables 1 through 7 below provide RB definitions to support different TTIs and subcarrier spacing. (It should be noted that these tables may be extended to include more information such as CP length and other supported waveforms.)

TABLE 1

Resource Block Type 1
(legacy Mobile Broadband
(MBB), low freq. band, normal
latency - TTI of 1 ms)

| | |
|---|---|
| Subcarrier spacing | 15 kHz |
| TTI | 1 ms |
| Number of OFDM symbols per TTI | 14 |
| Number of subcarriers per RB | 12 |
| Bandwidth per RB | 180 kHz |
| Number of resource elements (REs) per RB | 168 = 12 × 14 |

TABLE 2

Resource Block Type 2
(MCC/V2X, low freq. band,
low latency - TTI of 0.2 ms)

| | |
|---|---|
| Subcarrier spacing | 15 kHz |
| TTI | 0.2 ms |
| Number of OFDM symbols per TTI | 2 |
| Number of subcarriers per resource block | 72 |
| Bandwidth per RB | 1080 kHz |
| Number of REs per RB | 144 = 72 × 2 |

TABLE 3

Resource Block Type 3
(MBB/MCC/V2X, low to mid freq.
band, low latency - TTI of 0.2 ms)

| | |
|---|---|
| Subcarrier spacing | 75 kHz |
| TTI | 0.2 ms |
| Number of OFDM symbols per TTI | 14 |
| Number of subcarriers per resource block | 12 |
| Bandwidth per RB | 900 kHz |
| Number of REs per RB | 168 = 12 × 14 |

TABLE 4

Resource Block Type 4
(MBB, high freq. band,
low latency - TTI of 20 us)

| | |
|---|---|
| Subcarrier spacing | 750 kHz |
| TTI | 20 us |
| Number of OFDM symbols per TTI | 14 |
| Number of subcarriers per resource block | 12 |
| Bandwidth per RB | 9 MHz |
| Number of REs per RB | 168 = 12 × 14 |

TABLE 5

Resource Block Type 5
(MBB, high freq. band,
low latency - TTI of 10 us)

| | |
|---|---|
| Subcarrier spacing | 1500 kHz |
| TTI | 10 us |
| Number of OFDM symbols per TTI | 14 |
| Number of subcarriers per resource block | 12 |
| Bandwidth per RB | 18 MHz |
| Number of REs per RB | 168 = 12 × 14 |

TABLE 6

Resource Block Type 6
(MMC, low cost - TTI of 2 ms)

| | |
|---|---|
| Subcarrier spacing | 7.5 kHz |
| TTI | 2 ms |
| Number of OFDM symbols per TTI | 14 |
| Number of subcarriers per resource block | 12 |
| Bandwidth per RB | 90 kHz |
| Number of REs per RB | 168 = 12 × 14 |

TABLE 7

Resource Block Type 7
(MMC, low cost - TTI of 4 ms)

| | |
|---|---|
| Subcarrier spacing | 3.75 kHz |
| TTI | 4 ms |
| Number of OFDM symbols per TTI | 14 |
| Number of subcarriers per resource block | 12 |
| Bandwidth per RB | 36 kHz |
| Number of REs per RB | 168 = 12 × 14 |

Extended DMRS Pattern

Each RB may call for some embedded Demodulation Reference Signals (DMRS) to enable channel estimation for coherent demodulation of transmitted control and data signals. The above-defined RB Types 1 and 3 through 7 have a Resource Block of 14 OFDM symbols per TTI across 12 subcarriers. Since existing LTE Resource Blocks have 14 OFDM symbols per TTI across 12 subcarriers, existing DMRS patterns currently specified for use in LTE may be reused for RB Types 1 and 3 through 7. The above-defined RB Type 2, however, has a Resource Block of 2 OFDM symbols per TTI across 72 subcarriers, and as a result the existing DMRS patterns specified for use in LTE may not be reused for Type 2 RBs.

Figure 3:
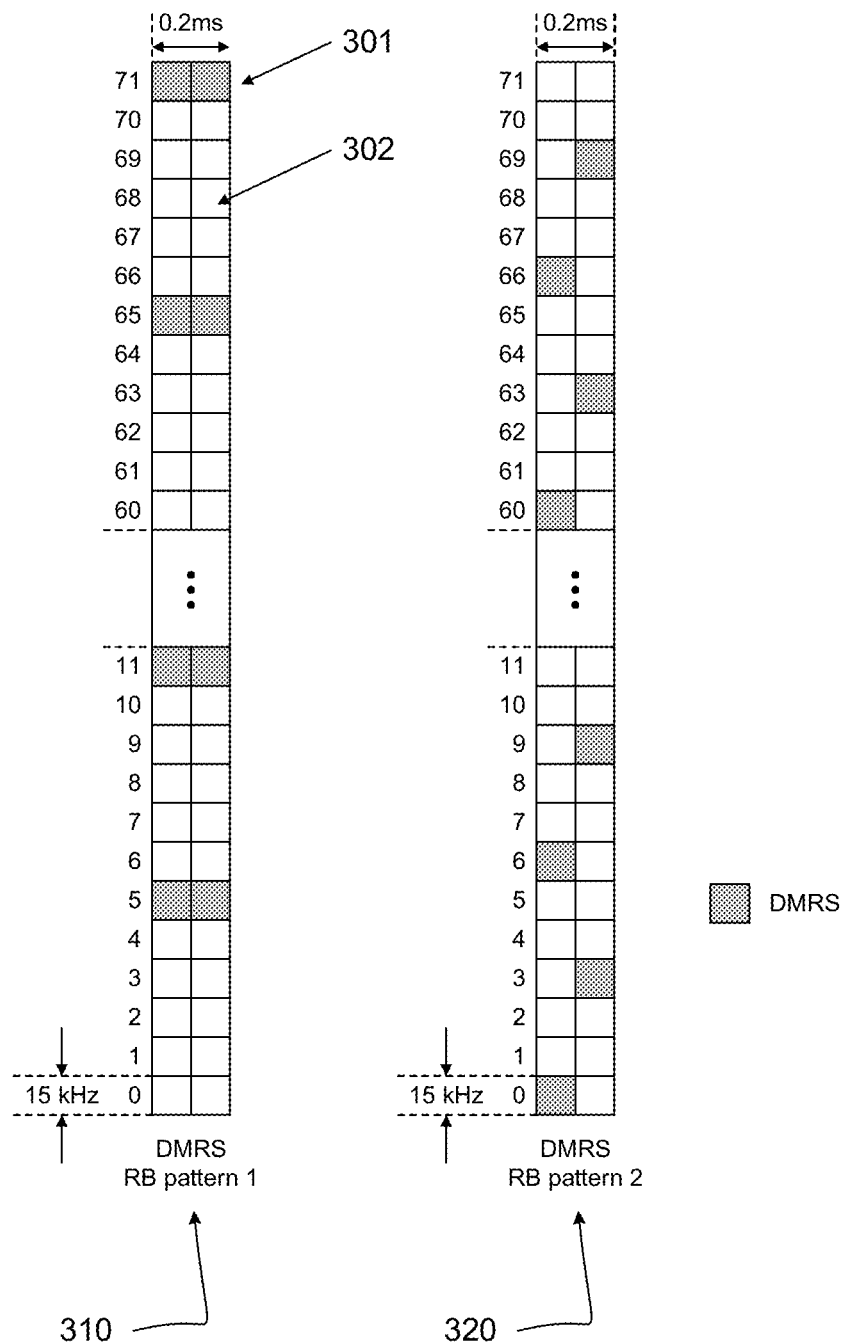
FIG. 3 illustrates example Demodulation Reference Signal (DMRS) patterns for Resource Blocks (RBs) of Type 2, in accordance with some embodiments of the disclosure.

FIG. 3 illustrates example Demodulation Reference Signal (DMRS) patterns for Resource Blocks (RBs) of Type 2, in accordance with some embodiments of the disclosure. FIG. 3 depicts a first DMRS RB pattern 310 and a second DMRS RB pattern 320. Both first DMRS RB pattern 310 and second DMRS RB pattern 320 comprise a plurality of resource elements 302 across a resource block 301. In accordance with the definition in Table 2 above, each resource block 301 has a TTI of approximately 0.2 ms, with two OFDM symbols per TTI, and a subcarrier spacing of approximately 15 kHz, with 72 subcarriers per RB. (Despite this difference from existing LTE, the DMRS signal sequence generation method of LTE may be extended to Type 2 RBs.)

For both first DMRS RB pattern 310 and second DMRS RB pattern 320, DMRS symbols may be placed in every sixth subcarrier across the frequency bandwidth of the RB. In first DMRS RB pattern 310, DMRS symbols may be placed in both OFDM symbols for every sixth subcarrier beginning with subcarrier 5. In contrast, in second DMRS RB pattern 320, DMRS symbols may be placed in the first OFDM symbol for every sixth subcarrier beginning with subcarrier 0, while DMRS symbols may be placed in the second OFDM symbol for every sixth subcarrier beginning with subcarrier 3.

Synchronization Signal and PBCH Coverage Extension for Extended RB Types

Each supported partition may transmit its Synchronization Signal (SS) in such as manner as to enable UEs to achieve downlink synchronization despite potential differences in TTI and subcarrier spacing in comparison with a primary resource partition. As discussed above, resource partition configuration on a UE-specific basis may advantageously reduce system signaling overhead, and as a result any particular UE need not be aware of all resource partitions supported by a radio resource map. Each resource partition may accordingly operate in a standalone manner to support various single-service UEs (e.g., smart meters or sensors supporting MMC) in connecting directly to a network without accessing a primary partition first. A resource-partition-specific PBCH may accordingly be employed.

In order to retain SS overhead and synchronization tracking capability similar to that existing in LTE, for RB Types 3 through 7, one SS may be transmitted every five TTIs. For RB Type 2, one SS may be transmitted every twenty-five TTIs (which may be substantially similar, resource-element-wise, to five TTIs of RB Types 3 through 7).

In order to retain MIB and/or PBCH coverage similar to that existing in LTE, for RB Types 3 through 7, one PBCH subblock may be transmitted in six central RBs of a resource partition (as in existing LTE). For RB Type 2, one PBCH subblock may be transmitted in a central RB of a resource partition.

For RB Types 3 through 7, one code block of PBCH may comprise four PBCH subblocks, while for RB Type 2, one code block of PBCH may comprise eight PBCH subblocks. To retain PBCH overhead similar to that existing in LTE, for RB Types 3 through 7, one PBCH subblock may be transmitted every ten TTIs, while for RB Type 2, one PBCH subblock may be transmitted every 25 TTIs.

A time interval between two adjacent PBCH subblocks may define a frame length. Moreover, a number of the PBCH subblock within the PBCH code, or the PBCH subblock index, may implicitly represent a frame number. For this reason, for RB Types 3 through 7, two least significant bits of the frame number might not be included in an MIB, while for RB Type 2, three least significant bits of the frame number might not be included in an MIB. Table 8 below summarizes radio frame durations for the different RB Types defined above.

TABLE 8

Radio fame durations for different RB Types

| | |
|---|---|
| RB Type 1 (TTI of 1.0 ms) | 10 ms |
| RB Type 2 (TTI of 0.2 ms) | 5.0 ms |

TABLE 8-continued

Radio fame durations for different RB Types

| RB Types 3, 4, and 5 (TTI of 0.2 ms) | 2.0 ms |
|---|---|
| RB Type 6 (TTI of 2.0 ms) | 20 ms |
| RB Type 7 (TTI of 5.0 ms) | 50 ms |

Several coverage extension designs for the various RB Types are also provided below. In some embodiments, Cell-Specific Reference Signals (CRS) may not be required for the new RB Types, which may advantageously save system overhead.

SS and PBCH Design for RB Type 2

Figure 4:
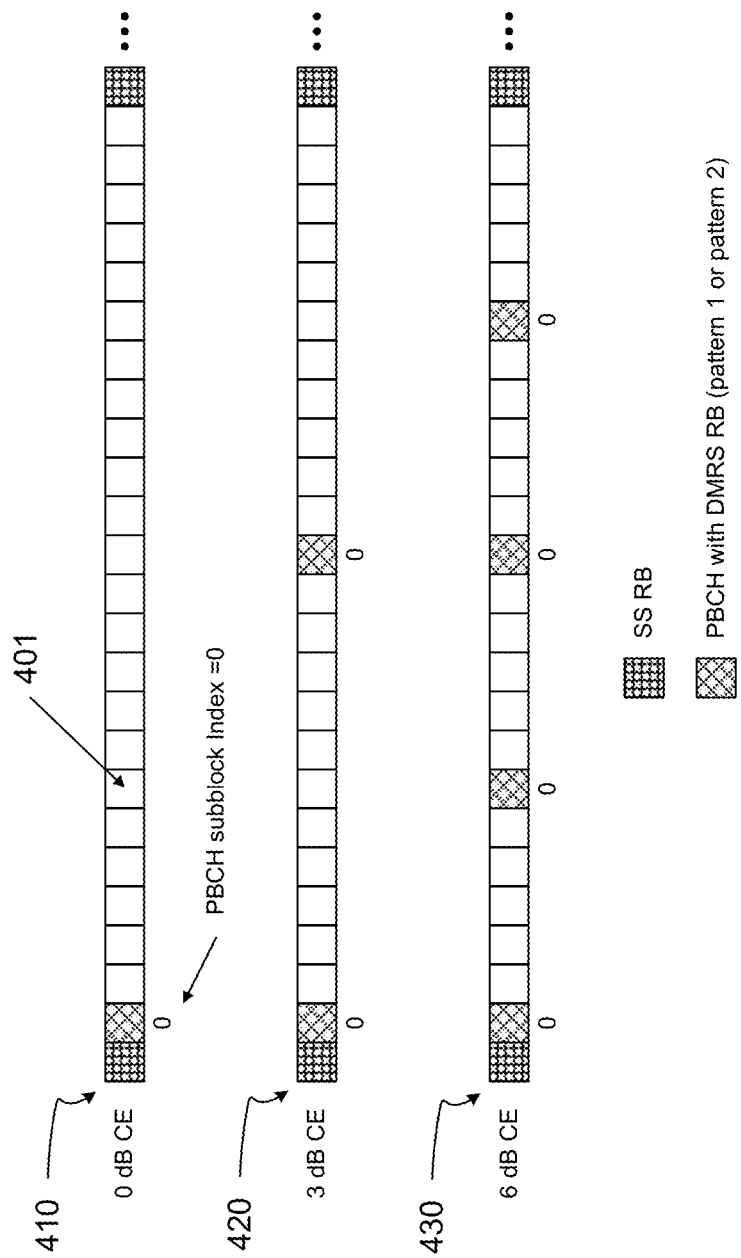
FIG. 4 illustrates example Synchronization Signal (SS) and Physical Broadcast Channel (PBCH) periodicities for RBs of Type 2, in accordance with some embodiments of the disclosure.

FIG. 4 illustrates example Synchronization Signal (SS) and Physical Broadcast Channel (PBCH) periodicities for RBs of Type 2, in accordance with some embodiments of the disclosure. First subblock 410 may correspond with no coverage extension (e.g., a 0 dB degree of coverage extension), second subblock 420 may correspond with a 3 dB degree of coverage extension, and third subblock 430 may correspond with a 6 dB degree of coverage extension.

As discussed above, for RB Type 2, one PBCH code block may comprise eight PBCH subblocks, with PBCH subblocks being transmitted every 25 TTIs. Each of first subblock 410, second subblock 420, and third subblock 430 may comprise a plurality of resource blocks 401, beginning with an SS RB and followed by a PBCH RB. Each subblock may extend over twenty-five RBs, then repeat.

Second subblock 420 and third subblock 430 may repeat the PBCH RB, depending upon the degree of coverage extension. For a 3 dB degree of coverage extension, second subblock 420 may repeat the PBCH RB on the twelfth RB after the initial PBCH RB. For a 6 dB degree of coverage extension, third subblock 430 may repeat the PBCH RB on every sixth RB after the initial PBCH RB (including the twelfth RB after the initial PBCH RB).

The PBCH RB may correspond to a PBCH subblock index which may represent the number of the PBCH subblock within a PBCH code block, starting with 0 and incrementing to 7 over eight PBCH subblock transmissions. The eighth PBCH subblock may accordingly be the final PBCH subblock in the PBCH code block.

Figure 5:
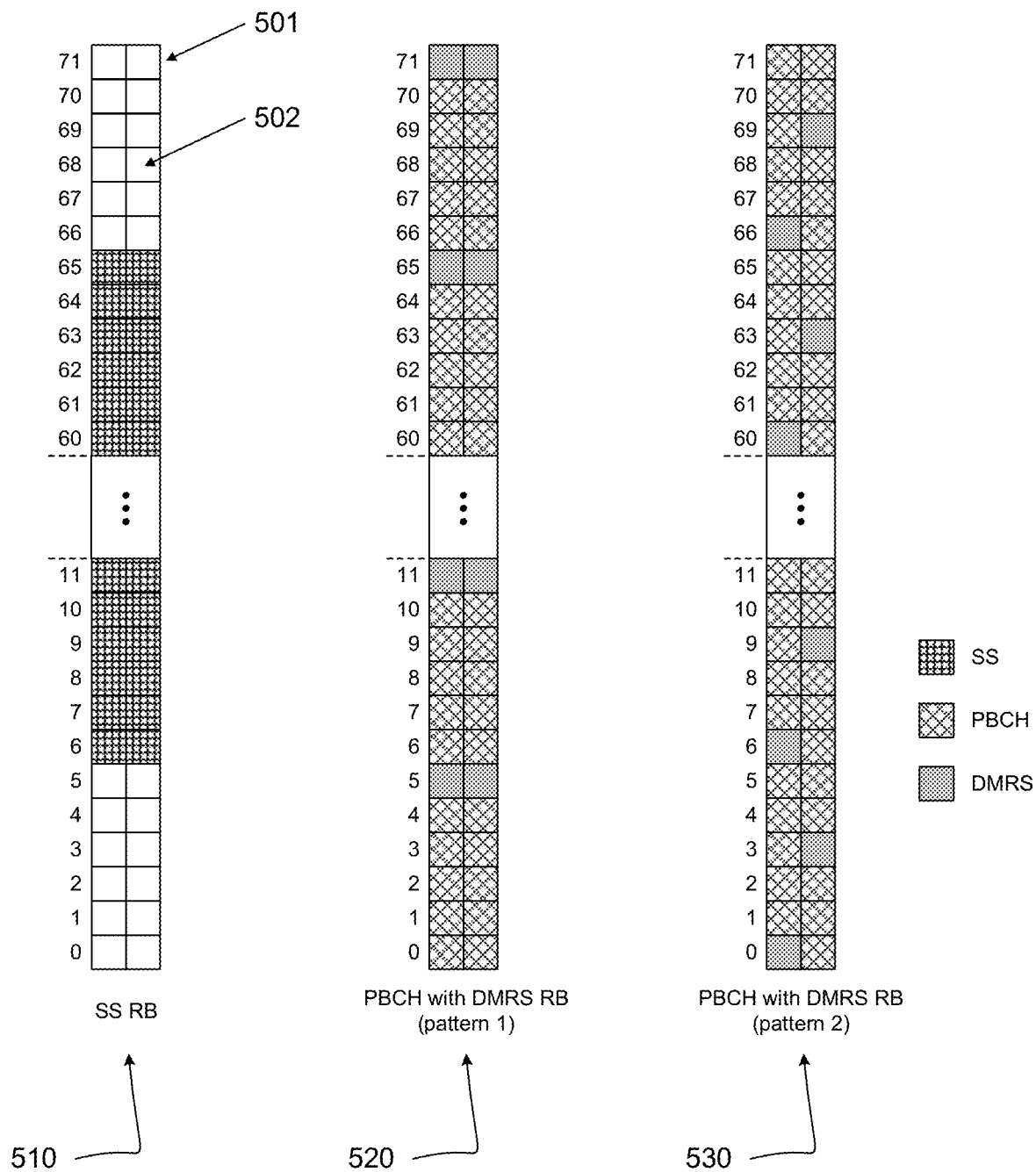
FIG. 5 illustrates example SS and PBCH patterns for RBs of Type 2, in accordance with some embodiments of the disclosure.

FIG. 5 illustrates example SS and PBCH patterns for RBs of Type 2, in accordance with some embodiments of the disclosure. FIG. 5 depicts an SS RB pattern 510, a first PBCH RB pattern 520, and a second PBCH RB pattern 530, each of which may comprise a plurality of resource elements 502 across a resource block 501.

SS RB pattern 510 may include SS OFDM symbols placed on the central 60 subcarriers, but might not include any DMRS symbols. First PBCH RB pattern 520 may include PBCH symbols placed on most subcarriers, except for those subcarriers on which DMRS has been placed, which may be substantially similar to those subcarriers on which DMRS is placed as depicted for first DMRS RB pattern 310 of FIG. 3. Similarly, second PBCH RB pattern 530 may include PBCH symbols placed on most subcarriers except for subcarriers on which DMRS has been placed, which may be substantially similar to those subcarriers on which DMRS is placed as depicted for second DMRS RB pattern 320 of FIG. 3.

With reference to FIGS. 4 and 5, eight PBCH subblocks of 240 bits may be evenly distributed in a 40 ms time window, which may permit PBCH coding gain similar to existing PBCH coding gain in LTE. Moreover, two DMRS patterns may be used for PBCH coherent demodulation.

SS and PBCH design for RB Types 3-7

Figure 6:
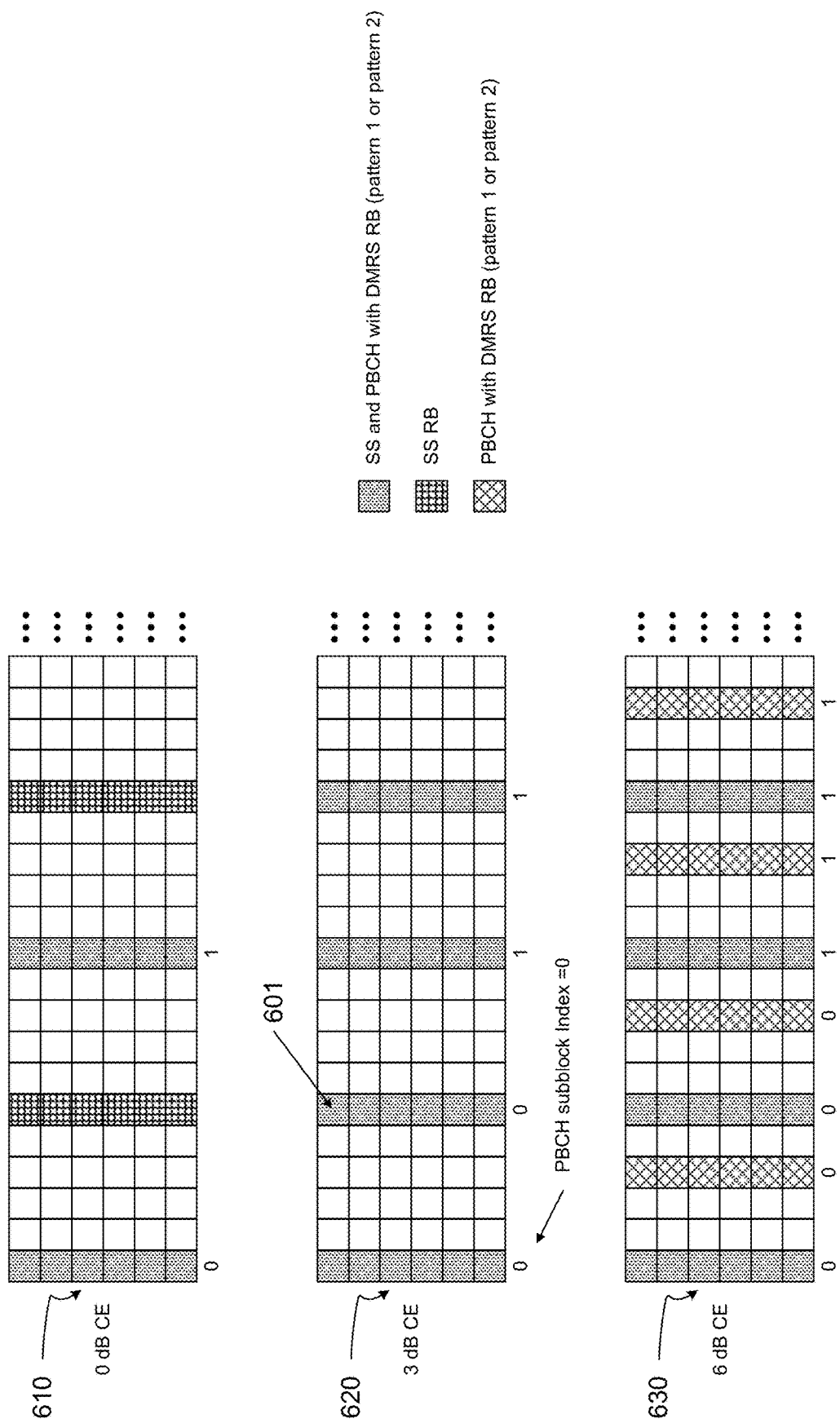
FIG. 6 illustrates example SS and PBCH periodicities for RBs of Types 3-7, in accordance with some embodiments of the disclosure.

FIG. 6 illustrates example SS and PBCH periodicities for RBs of Types 3-7, in accordance with some embodiments of the disclosure. First subblock 610 may correspond to no coverage extension (e.g., a 0 dB degree of coverage extension), second subblock 620 may correspond with a 3 dB degree of coverage extension, and third subblock 630 may correspond with a 6 dB degree of coverage extension. PBCH coverage extension may be advantageous for mid-to-high frequency Mobile Broadband (MBB) and low cost MMC.

As discussed above, for RB Types 3-7, one PBCH code block may comprise four PBCH subblocks, and each PBCH subblock may be transmitted every 10 TTIs. Each of first subblock 610, second subblock 620, and third subblock 630 may comprise a plurality of resource blocks 601, and may begin with an SS and PBCH with RB (of either a first DMRS pattern or a second DMRS pattern).

For first subblock 610 with no coverage extension, the fifth RB after the initial SS and PBCH with DMRS RB may be an SS RB. After another five RB, first subblock 610 may repeat. For a 3 dB degree of coverage extension, second subblock 620 may repeat the SS and PBCH with DMRS RB pattern on the fifth RB after the initial SS and PBCH with DMRS RB (instead of placing an SS RB, as with first subblock 610). After another five RB, second subblock 620 may repeat. For a 6 dB degree of coverage extension, third subblock 630 may place a PBCH with DMRS RB on the third and eighth RBs after the initial SS and PBCH with DMRS RB, and may also repeat the SS and PBCH with DMRS RB on the fifth RB after the initial SS and PBCH with DMRS RB.

Both the SS and PBCH with DMRS RB and the PBCH with DMRS RB may correspond to a PBCH subblock index which may represent the number of the PBCH subblock within a PBCH code block, starting with 0 and incrementing to 3 over four PBCH subblock transmissions. The fourth PBCH subblock may accordingly be the final PBCH subblock in the PBCH code block.

Figure 7:
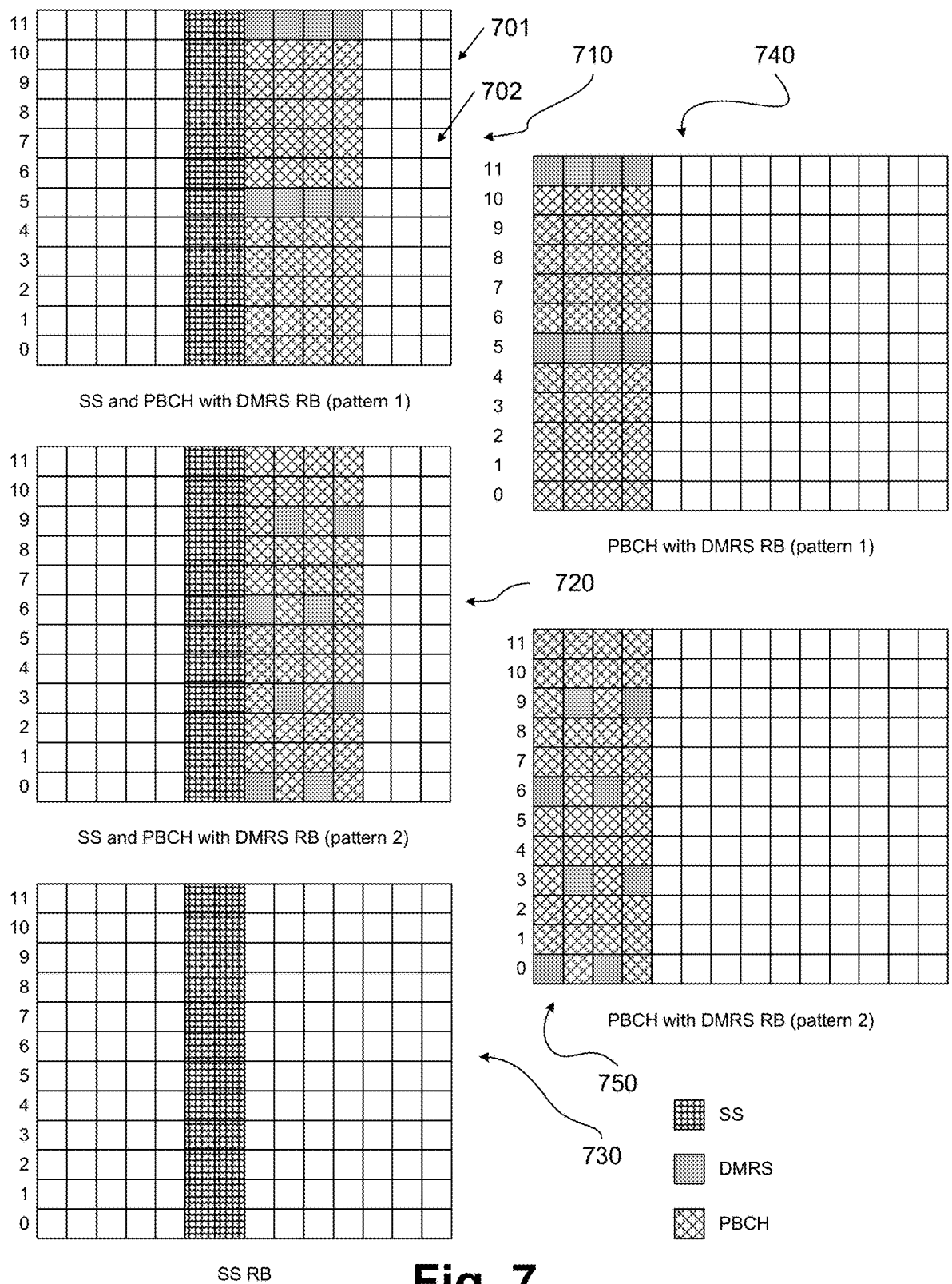
FIG. 7 illustrates example SS and PBCH patterns for RBs of Types 3-7, in accordance with some embodiments of the disclosure.

FIG. 7 illustrates example SS and PBCH patterns for RBs of Types 3-7, in accordance with some embodiments of the disclosure. FIG. 7 depicts a first SS and PBCH with DMRS RB pattern 710, a second SS and PBCH with DMRS RB pattern 720, an SS RB pattern 730, a first PBCH with DMRS RB pattern 740, and a second PBCH with DMRS RB pattern 750, each of which may comprise a plurality of resource elements 702 across a resource block 701.

Due to the similarities between the dimensions of RB Types 3 through 7 and existing LTE RBs, the placement of SS and PBCH within the RB may be similar to the placement in existing LTE RBs. First SS and PBCH with DMRS RB pattern 710, second SS and PBCH with DMRS RB pattern 720, and SS RB pattern 730 may include SS OFDM symbols placed on all subcarriers for the sixth and seventh symbols of the RB. First SS and PBCH with DMRS RB pattern 710 and second SS and PBCH with DMRS RB pattern 720 may further include PBCH and DMRS OFDM symbols on all subcarriers for the eighth through the eleventh OFDM symbols of the RB, in which DMRS symbols may be placed in every sixth subcarrier across the frequency bandwidth of the RB.

For first SS and PBCH with DMRS RB pattern 710, DMRS symbols may be placed in the sixth and twelfth subcarriers for the eighth OFDM symbol through the eleventh OFDM symbol. For second SS and PBCH with DMRS RB pattern 720, DMRS symbols may be placed in the first and sevenths subcarriers for the eighth OFDM symbol and the tenth OFDM symbol, while DMRS symbols may be placed in the fourth and tenth subcarriers for the ninth OFDM symbol and the eleventh OFDM symbol.

As with RB Type 2, two exemplary DMRS patterns may be used for PBCH coherent demodulation.

Resource Partition Specific CSI-RS Signal

A partition-specific discovery signal or CSI-RS may enable Radio Resource Measurement (RRM) for specific partition resources. For RB Types 3 through 7, CSI-RS similar to existing LTE CSI-RS may be adopted. RB Type 2 may be unable to use existing LTE CSI-RS.

Figure 8:
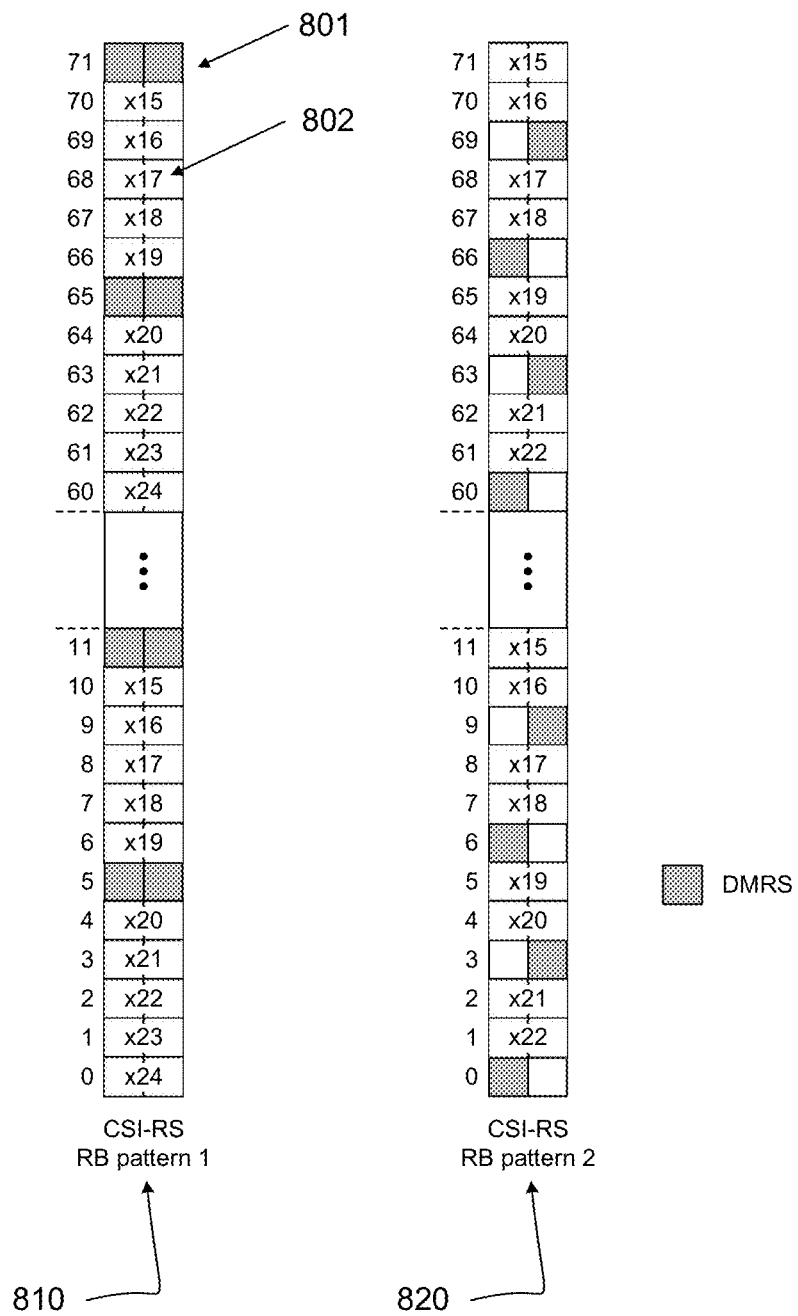
FIG. 8 illustrates example Channel State Information Reference Signal (CSI-RS) patterns for RBs of Type 2, in accordance with some embodiments of the disclosure.

FIG. 8 illustrates example Channel State Information Reference Signal (CSI-RS) patterns for RBs of Type 2, in accordance with some embodiments of the disclosure. FIG. 8 depicts a first CSI-RS RB pattern 810 and a second CSI-RS RB pattern 820. Both first CSI-RS RB pattern 810 and second CSI-RS RB pattern 820 comprise a plurality of resource elements 802 across a resource block 801.

With reference to FIG. 3, first CSI-RS RB pattern 810 and second CSI-RS RB pattern 820 may include various DMRS symbols in accordance with first DMRS RB pattern 310 and second DMRS RB pattern 320. CSI antenna ports may be supported on subcarriers on which no DMRS has been placed for either OFDM symbol. Ten CSI-RS antenna ports (which may be numbered x15 through x24) may accordingly be supported for first CSI-RS RB pattern 810. In comparison, eight CSI-RS antenna ports (which may be numbered x15 through x22) may be supported for second CSI-RS RB pattern 820. Resource elements supporting the various antenna ports may repeat every twelve subcarriers.

Extended Primary Partition SIB for Secondary Partition Signaling

For systems supporting multiple resource partitions, such as partitions based upon the various different RB Types discussed above, one resource partition may become a primary partition of the system, and may serve a majority of the UEs camped in the system, while other resource partitions may become secondary resource partitions. A low-frequency resource partition providing standard voice and data service coverage may serve as a primary partition of the system. For example, resource partition 1 of FIG. 1 may act as a primary partition in an exemplary system.

In some cases, resource partitions may be overlapped in the time domain and/or the frequency domain. For instance, as shown in FIG. 1, resource partition 6 may be fully embedded in resource partition 1. In one practical scenario, fully overlapped resource partitions may comprise several narrow band (1.4 MHz) MMC resource partitions fully embedded in a wideband primary resource partition.

The overlapped resource partitions may also be active at the same time. To ensure that UEs in a primary partition have unambiguous RE mapping when an allocated primary Physical Resource Block (PRB) overlaps with one or more secondary resource partitions, resource allocation information about the embedded secondary partitions may be transmitted in an SIB of the primary partition. This may advantageously increase efficiency in comparison with signaling such information via a UE's dedicated signaling, which may incur large signaling overhead.

Multiple Service-Specific Resource Partition Aggregation

Sometimes, a UE capable of communicating with multiple services operating with different RB Types may be disposed to communicate with these services simultaneously. As an example, one application of a UE may be performing an MBB service like high definition live video streaming while another background application of the UE may be performing an MTC service, such as an MMC/MCC/V2X service.

Two methods are described below to assist a UE in performing multiple services and communicating with different resource partitions simultaneously. A first method is directed toward xPDCCH for 5G PDCCH set aggregation, which may be applied in aggregating multiple resource partitions with scheduled access. Secondary partitions may be treated as special data resource partitions with different RB Types inside a primary partition.

Figure 9:
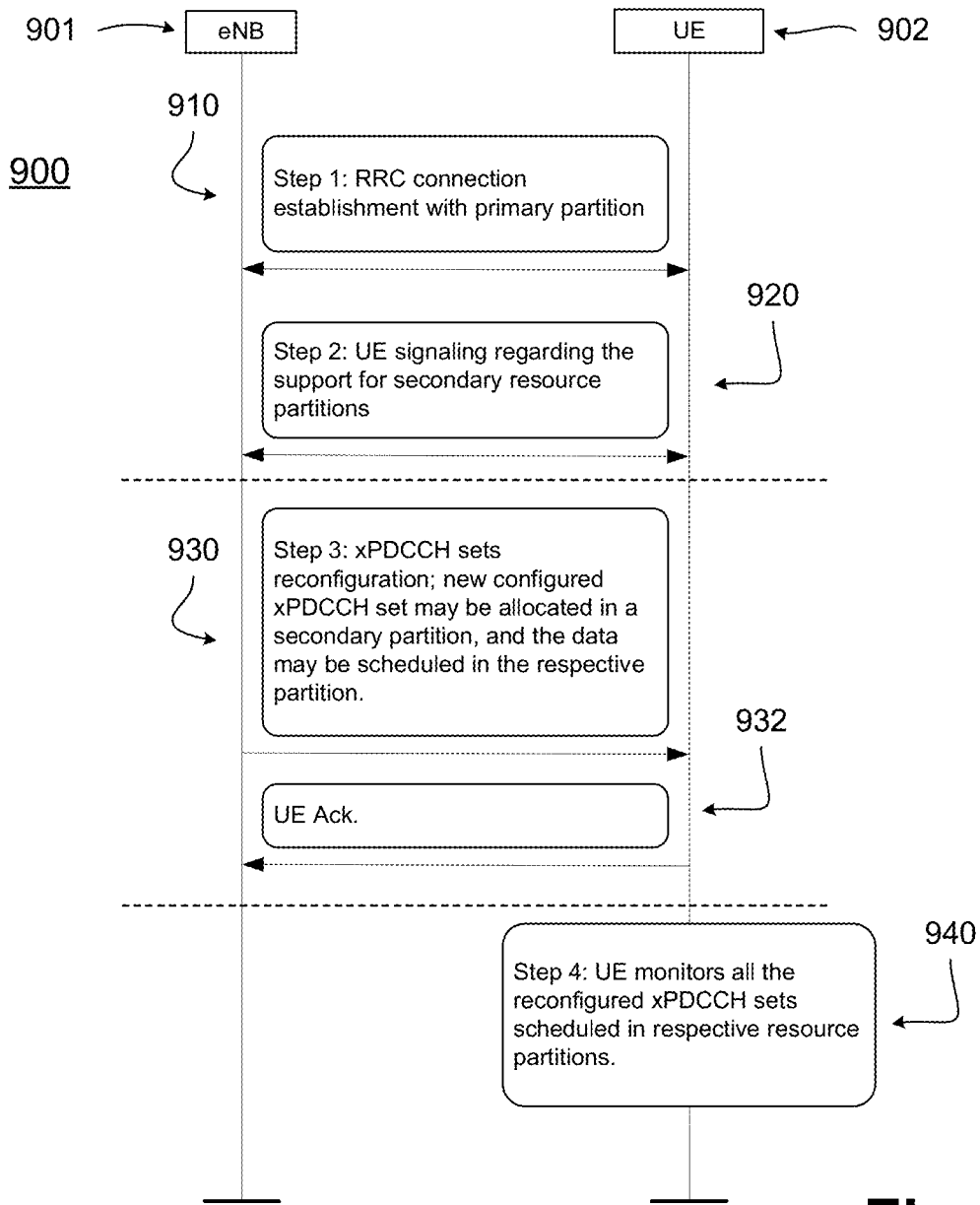
FIG. 9 illustrates a signaling diagram for extended Physical Downlink Control Channel (xPDCCH) for 5G Radio Access Technology (RAT) set aggregation, in accordance with some embodiments of the disclosure.

FIG. 9 illustrates a signaling diagram for extended Physical Downlink Control Channel (xPDCCH) for 5G Radio Access Technology (RAT) set aggregation, in accordance with some embodiments of the disclosure. Method 900 may involve an Evolved Node-B (eNB) 901 and a UE 902 undertaking various steps, which may be split into and/or grouped into various phases of the method.

A first phase of method 900 may pertain to RRC connection establishment and UE capability indication to a network. In a first step 910, UE 902 may establish an RRC Connection with a selected eNB 901, which may be a 5G eNB, via a primary partition which may be responsible for one or more control plane functions. The primary partition may provide a common xPDCCH search space for a 5G RAT for System Information (SI), Random Access Channel (RACH) response, and paging transmission. An initial UE-specific xPDCCH search space may be allocated in a primary partition. In a second step 920, UE 902 may signal to the network its capabilities for supporting various service-specific partitions.

A second phase of method 900 may pertain to xPDCCH reconfiguration in order to configure multiple xPDCCH sets. In a third step 930, based on the signaled capabilities for supporting various service-specific partitions of UE 902, eNB 901 may reconfigure the UE-specific search space with multiple xPDCCH sets by UE-dedicated RRC signaling. Each such xPDCCH set may be allocated within a specific resource partition, which may be considered a secondary partition. For each added xPDCCH set, the reconfiguration may include (without being limited to) the following information:

RB Type of the xPDCCH set and its scheduled partition;

Resource allocation of the partition (time-frequency resource positions and reoccurrence periodicity; may be non-overlapped, partially overlapped, or fully overlapped with a primary partition);

Resource allocation of xPDCCH set inside the partition; and

Quasi-collocated partition-specific CSI-RS configuration of the partition (which may include: CSI-RS sequence ID; Number of antenna ports; and time-frequency resource allocation for CSI-RS, such as bandwidth, TTI in a frame, and transmission periodicity in terms of a number of RBs and/or TTIs defined in the partition).

In an action 932, UE 902 may acknowledge the reconfiguration.

A third phase of method 900 may pertain to UE 902 monitoring multiple configured xPDCCH sets. In a fourth step 940, UE 902 may monitor multiple reconfigured xPDCCH sets allocated in various different resource partitions. The xPDCCH in a set may schedule downlink data packets and/or uplink data packets transmitted in the resource partition corresponding to the xPDCCH set.

A second method for assisting a UE in performing multiple services and communicating with different resource partitions simultaneously is directed toward extended carrier aggregation, which may be applicable to various kinds of resource partition aggregation. Each resource partition may support standalone operation on the basis of complete physical channels and reference signals provisions.

Figure 10:
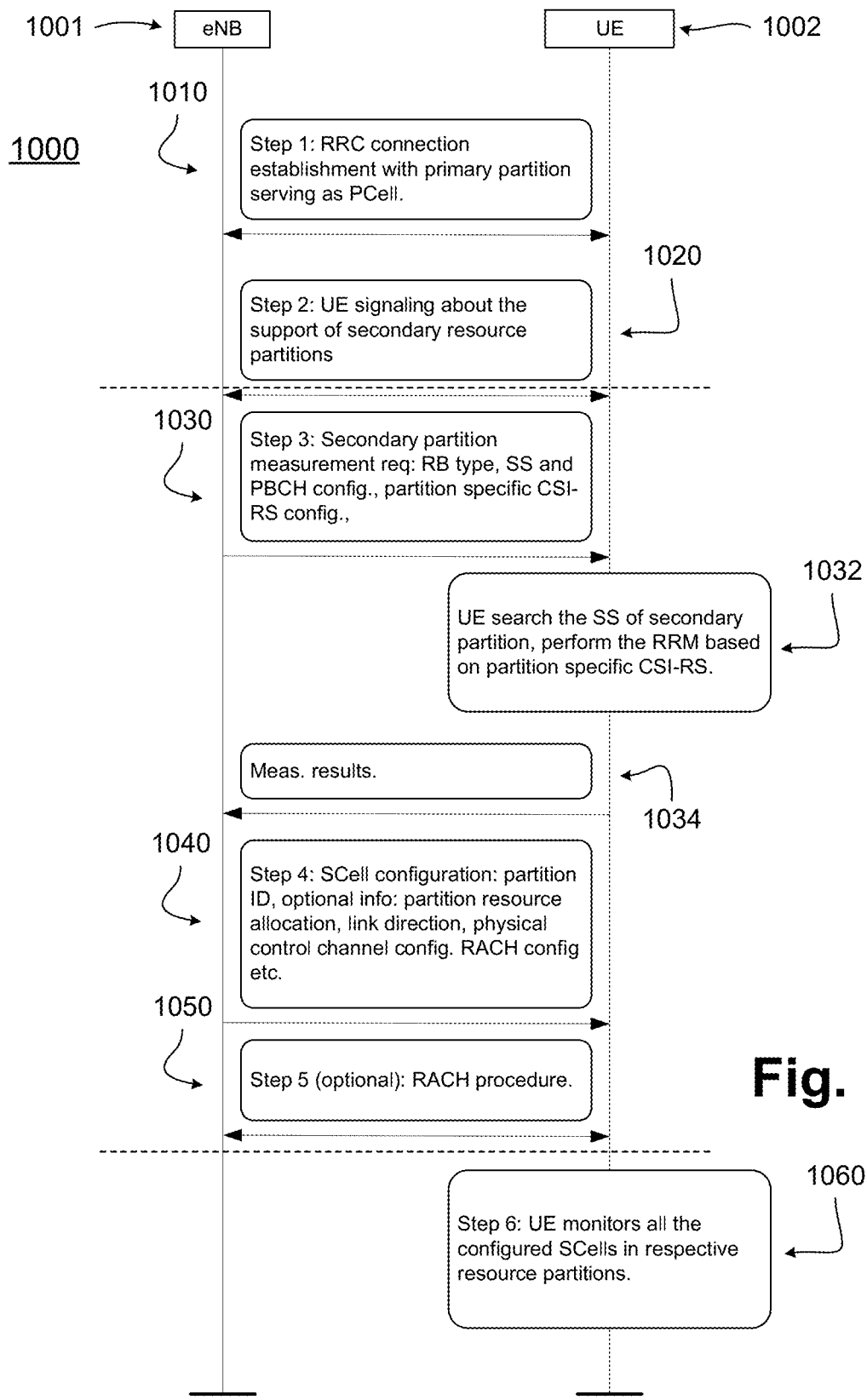
FIG. 10 illustrates a signaling diagram for extended Carrier Aggregation (CA) for partition aggregation, in accordance with some embodiments of the disclosure.

FIG. 10 illustrates a signaling diagram for extended Carrier Aggregation (CA) for partition aggregation, in accordance with some embodiments of the disclosure. Method 1000 may involve an eNB 1001 and a UE 1002 undertaking various steps, which may be split into and/or grouped into various phases of the method.

A first phase of the method may pertain to RRC connection establishment and UE 1002 signaling its capabilities to the network. In a first step 1010, UE 1002 may establish an RRC_Connection with a selected eNB 1001, which may be a 5G eNB, via a primary partition which may be responsible for one or more control plane functions and may serve as the primary cell of UE 1002. In a second step 1020, UE 1002 may to the network its capabilities for supporting various service-specific RB Types.

A second phase of method 1000 may pertain to secondary resource partition aggregation. In a third step 1030, the primary resource partition may request UE 1002 to perform RRM of one or more supported secondary partitions and report the measurement results. The measurement request information about the secondary partitions may include (without being limited to) the following information:

RB Type of the partition (an index to a supported RB Type in the standard);

SS and PBCH configuration of the partition (which may include: SS sequence ID defining the partition ID; Supported PBCH coverage extension; and Resource allocation for SS and PBCH (frequency location and radio frame boundary in the format of relative distance in terms of number of RBs and TTIs to the SS and radio frame boundary in the primary region; the SS and PBCH allocation of a secondary partition may be derived from its RB Type and radio frame boundary));

Partition specific CSI-RS configuration;

CSI-RS sequence ID;

Number of antenna ports; and

Time-frequency resource allocation for CSI-RS, such as bandwidth, TTI in a frame, and transmission periodicity in terms of a number of RBs and/or TTIs defined in the partition.

In an action 1032, UE 1002 may search the SS of a secondary partition and perform RRM based upon a partition-specific CSR-RS. In an action 1034, UE 1002 may return the requested measurements to eNB 1001.

In a fourth step 1040, based upon the measurement results provided by UE 1002, eNB 1001 may select and configure one or more service-specific resource partitions as Secondary Cells (SCells) identified to UE 1002 by partition ID, each SCell configuration including (without being limited to) the following parameters:

Partition ID; and, optionally,

The following information that may be received from an MIB/SIB of the secondary partition:

Resource allocation of the partition (time-frequency resource positions and reoccurrence periodicity; may be non-overlapped, partially overlapped, or fully overlapped with a primary partition);

Supported link direction (downlink transmission, uplink transmission, or both downlink transmission and uplink transmission);

Physical downlink/uplink control channel configuration (which may include: Region-specific common search space configuration; Resource block allocation; and/or Partition-specific SI-RNTI, RA-RNTI, and/or P-RNTI, which may be can be hardcoded in the specification);

UE specific search space configuration (which may include Resource block allocation and/or C-RNTI); and Random access resource configuration (which may include Resource pool allocations and/or Configurations for 5G physical random access channel (xPRACH)).

In a fifth step 1050, if an uplink transmission is supported in a secondary partition, UE 1002 may perform a contention-based or contention-free random access procedure to the correspondingly configured Scell.

A third phase of method 1000 may pertain to UE 1002 monitoring multiple configured secondary cells. In a sixth step 1060, UE 1002 may monitor a downlink data allocation or an uplink data assignment for a configured SCell using secondary resource partitions. Such downlink data allocation or uplink assignment may be signaled by a physical downlink control channel in the primary cell or the secondary cell. In some cases, a cross-partition scheduling mechanism may be applied, wherein a resource allocation in the secondary cell may be explicitly indicated in a downlink control indicator (DCI) format.

Figure 11:
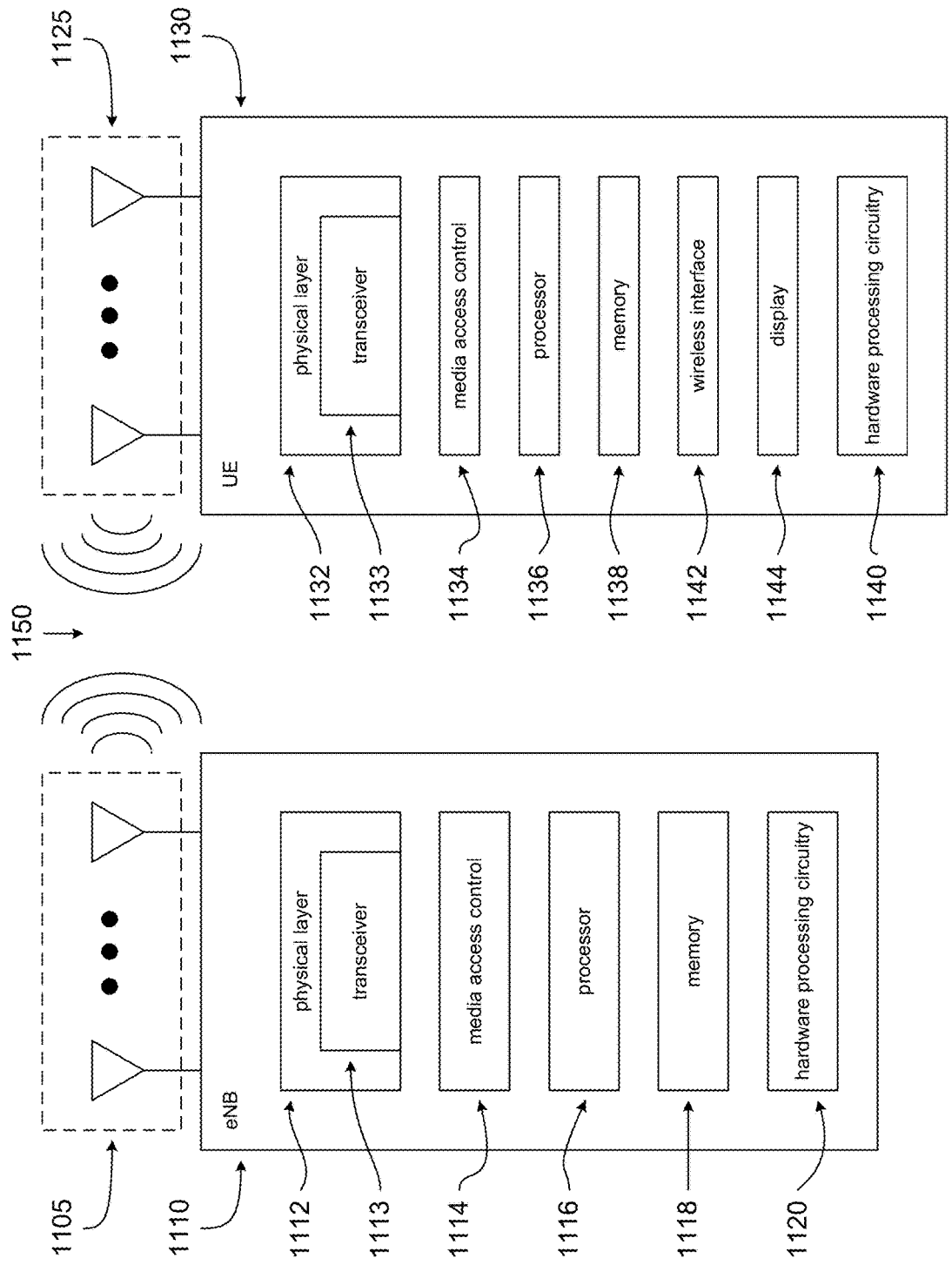
FIG. 11 illustrates an Evolved Node B (eNB) and a User Equipment (UE), in accordance with some embodiments of the disclosure.

FIG. 11 illustrates an eNB and a UE, in accordance with some embodiments of the disclosure. FIG. 11 includes block diagrams of an eNB 1110 and a UE 1130 which are operable to co-exist with each other and other elements of an LTE network. High-level, simplified architectures of eNB 1110 and UE 1130 are described so as not to obscure the embodiments. It should be noted that in some embodiments, eNB 1110 may be a stationary non-mobile device.

eNB 1110 is coupled to one or more antennas 1105, and UE 1130 is similarly coupled to one or more antennas 1125. However, in some embodiments, eNB 1110 may incorporate or comprise antennas 1105, and UE 1130 in various embodiments may incorporate or comprise antennas 1125.

In some embodiments, antennas 1105 and/or antennas 1125 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1105 are separated to take advantage of spatial diversity.

eNB 1110 and UE 1130 are operable to communicate with each other on a network, such as a wireless network. eNB 1110 and UE 1130 may be in communication with each other over a wireless communication channel 1150, which has both a downlink path from eNB 1110 to UE 1130 and an uplink path from UE 1130 to eNB 1110.

As illustrated in FIG. 11, in some embodiments, eNB 1110 may include a physical layer circuitry 1112, a MAC (media access control) circuitry 1114, a processor 1116, a memory 1118, and a hardware processing circuitry 1120. A person skilled in the art will appreciate that other components not shown may be used in addition to the components shown to form a complete eNB.

In some embodiments, physical layer circuitry 1112 includes a transceiver 1113 for providing signals to and from UE 1130. Transceiver 1113 provides signals to and from UEs or other devices using one or more antennas 1105. In some embodiments, MAC circuitry 1114 controls access to the wireless medium. Memory 1118 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 1120 may comprise logic devices or circuitry to perform various operations. In some embodiments, processor 1116 and memory 1118 are arranged to perform the operations of hardware processing circuitry 1120, such as operations described herein with reference to logic devices and circuitry within eNB 1110 and/or hardware processing circuitry 1120.

As is also illustrated in FIG. 11, in some embodiments, UE 1130 may include a physical layer circuitry 1132, a MAC circuitry 1134, a processor 1136, a memory 1138, a hardware processing circuitry 1140, a wireless interface 1142, and a display 1144. A person skilled in the art would appreciate that other components not shown may be used in addition to the components shown to form a complete UE.

In some embodiments, physical layer circuitry 1132 includes a transceiver 1133 for providing signals to and from eNB 1110 (as well as other eNBs). Transceiver 1133 provides signals to and from eNBs or other devices using one or more antennas 1125. In some embodiments, MAC circuitry 1134 controls access to the wireless medium. Memory 1138 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 1142 may be arranged to allow the processor to communicate with another device. Display 1144 may provide a visual and/or tactile display for a user to interact with UE 1130, such as a touch-screen display. Hardware processing circuitry 1140 may comprise logic devices or circuitry to perform various operations. In some embodiments, processor 1136 and memory 1138 may be arranged to perform the operations of hardware processing circuitry 1140, such as operations described herein with reference to logic devices and circuitry within UE 1130 and/or hardware processing circuitry 1140.

Elements of FIG. 11, and elements of other figures having the same names or reference numbers, can operate or function in the manner described herein with respect to any such figures (although the operation and function of such elements is not limited to such descriptions). For example, FIGS. 12, 13, and 16 also depict embodiments of eNBs, hardware processing circuitry of eNBs, UEs, and/or hardware processing circuitry of UEs, and the embodiments described with respect to FIG. 11 and FIGS. 12, 13, and 16 can operate or function in the manner described herein with respect to any of the figures.

In addition, although eNB 1110 and UE 1130 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 12:
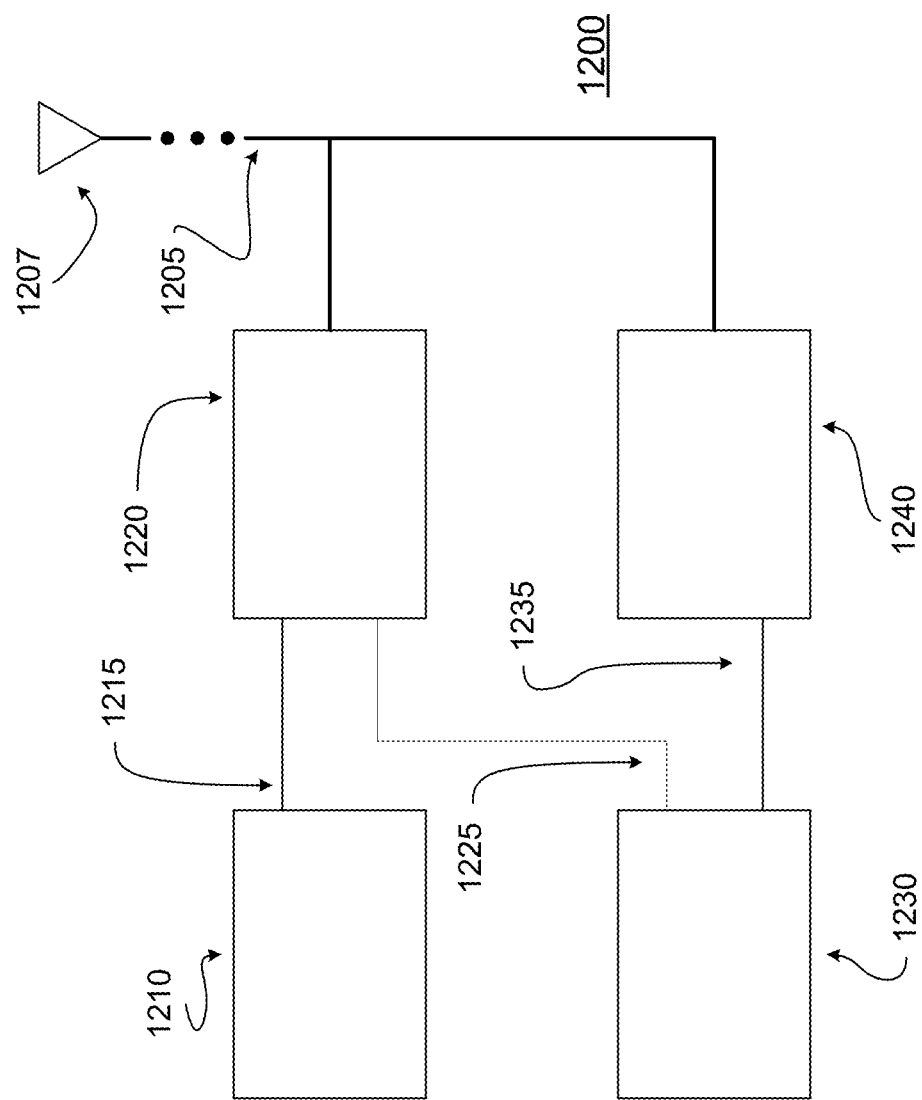
FIG. 12 illustrates hardware processing circuitry for an eNB for flexible radio resource management signaling, in accordance with some embodiments of the disclosure.

FIG. 12 illustrates hardware processing circuitry for an eNB for flexible radio resource management signaling, in accordance with some embodiments of the disclosure. A hardware processing circuitry 1200 may comprise logic devices and/or circuitry operable to perform various operations. For example, with reference to FIGS. 11 and 12, eNB 1110 (or various elements or components therein, such as hardware processing circuitry 1120, or combinations of elements or components therein) may include part of, or all of, hardware processing circuitry 1200. In some embodiments, processor 1116 and memory 1118 (and/or other elements or components of eNB 1110) may be arranged to perform the operations of hardware processing circuitry 1200, such as operations described herein with reference to devices and circuitry within hardware processing circuitry 1200. For example, one or more devices or circuits of hardware processing circuitry 1200 may be implemented by combinations of software-configured elements and/or other hardware elements.

In some embodiments, hardware processing circuitry 1200 may comprise one or more antenna ports 1205 operable to provide various transmissions over a wireless communication channel (such as wireless communication channel 1150). Antenna ports 1205 may be coupled to one or more antennas 1207 (which may be antennas 1105). In some embodiments, hardware processing circuitry 1200 may incorporate antennas 1207, while in other embodiments, hardware processing circuitry 1200 may merely be coupled to antennas 1207.

Antenna ports 1205 and antennas 1207 may be operable to provide signals from an eNB to a wireless communications channel and/or a UE, and may be operable to provide signals from a UE and/or a wireless communications channel to an eNB. For example, antenna ports 1205 and antennas 1207 may be operable to provide transmissions from eNB 1110 to wireless communication channel 1150 (and from there to UE 1130, or to another UE). Similarly, antennas 1207 and antenna ports 1205 may be operable to provide transmissions from a wireless communication channel 1150 (and beyond that, from UE 1130, or another UE) to eNB 1110.

An apparatus of eNB 1110 (or another eNB or base station) may be operable to communicate with a UE on a wireless network, and may comprise hardware processing circuitry 1200. In some embodiments, the eNB (or other base station) may be a device comprising an application processor, a memory, one or more antenna ports, and an interface for allowing the application processor to communicate with another device.

With reference to FIG. 12, hardware processing circuitry 1200 may comprise a first circuitry 1210, a second circuitry 1220, a third circuitry 1230, and a fourth circuitry 1240. First circuitry 1210 may be operable to establish an RRC_Connection with a UE such as UE 1130 (or another UE). The RRC_Connection may be established by one or more transmissions provided to second circuitry 1220 over an RRC_Connection interface 1215.

Second circuitry 1220 may be operable to receive a transmission from UE 1130 listing one or more service-specific resource partitions supported by UE 1130 within a wireless cellular communications system bandwidth. Information about the one or more service-specific resource partitions may be provided to third circuitry 1230 over a resource partition interface 1225. In some embodiments, one or more of the service-specific resource partitions may have a resource-block definition that differs from a legacy LTE resource-block definition with respect to at least one of: a subcarrier spacing, a TTI, a number of OFDM symbols per TTI, a number of subcarriers per RB, a bandwidth per RB, a number of Resource Elements (REs) per RB, and a cyclic prefix length. For various embodiments, one or more of the service-specific resource partitions may be a secondary partition.

Third circuitry 1230 may be operable to provide a partition configuration transmission 1235 to fourth circuitry 1240 for configuring one or more of the service-specific resource partitions. In some embodiments, third circuitry 1230 may be operable to provide resource allocation information about at least one secondary partition in an SIB transmission.

Fourth circuitry 1240 may be operable to transmit the partition configuration transmission to UE 1130. In some embodiments, fourth circuitry 1240 may be operable to transmit an SIB transmission to UE 1130 in a primary partition.

In some embodiments, third circuitry 1230 may be operable to provide a resource-partition-specific PBCH transmission to fourth circuitry 1240 over a downlink transmission interface 1235. In such embodiments, fourth circuitry 1240 may be operable to transmit to UE 1130 a resource-partition-specific PBCH transmission received over downlink transmission interface 1235.

In some embodiments, third circuitry 1230 may be operable to provide a plurality of PBCH transmissions over downlink transmission interface 1235. In such embodiments, fourth circuitry 1240 may be operable to transmit the PBCH transmissions to UE 1130 at a first rate of repetition under a first degree of coverage extension, and may also operable to transmit PBCH transmissions to UE 1130 at a second rate of repetition under a second degree of coverage extension. The second rate of repetition may be greater than the first rate of repetition, and the second degree of coverage extension may be greater than the first degree of coverage extension.

For various embodiments, third circuitry 1230 may be operable to provide a set of xPDCCH transmissions for one of the service-specific resource partitions over downlink transmission interface 1235. In such embodiments, fourth circuitry 1240 may be operable to transmit the set of xPDCCH transmissions to UE 1130. The set of xPDCCH transmissions may include one or more of: a resource block type of the service-specific resource partition; a resource allocation of the service-specific resource partition; and a quasi-collocated partition-specific Channel State Information Reference Signals (CSI-RS) configuration.

Third circuitry 1230 may be operable to provide a primary resource partition request transmission over downlink transmission interface 1235, and fourth circuitry 1240 may be operable to transmit the primary resource partition request transmission to UE 1130. For such embodiments, the primary resource partition request transmission may include one or more of: a resource block type of the service-specific resource partition; a Synchronization Signal (SS) ID defining a partition ID; a supported degree of PBCH coverage extension; a resource allocation for SS and PBCH transmissions; and a partition-specific Channel State Information Reference Signals (CSI-RS) configuration.

In some embodiments, first circuitry 1210, second circuitry 1220, third circuitry 1230, and fourth circuitry 1240 may be implemented as separate circuitries. In other embodiments, one or more of first circuitry 1210, second circuitry 1220, third circuitry 1230, and fourth circuitry 1240 may be combined and implemented together in a circuitry without altering the essence of the embodiments. In various embodiments, processor 1116 (and/or one or more other processors which eNB 1110 may comprise) may be arranged to perform the operations of first circuitry 1210, second circuitry 1220, third circuitry 1230, and/or fourth circuitry 1240. In such embodiments, first circuitry 1210, second circuitry 1220, third circuitry 1230, and/or fourth circuitry 1240 may accordingly be implemented by various combinations of software-configured elements (e.g., processor 1116, and/or one or more other processors) and/or other hardware elements. In various embodiments, processor 1116 (and/or one or more other processors which eNB 1110 may comprise) may be a baseband processor.

Figure 13:
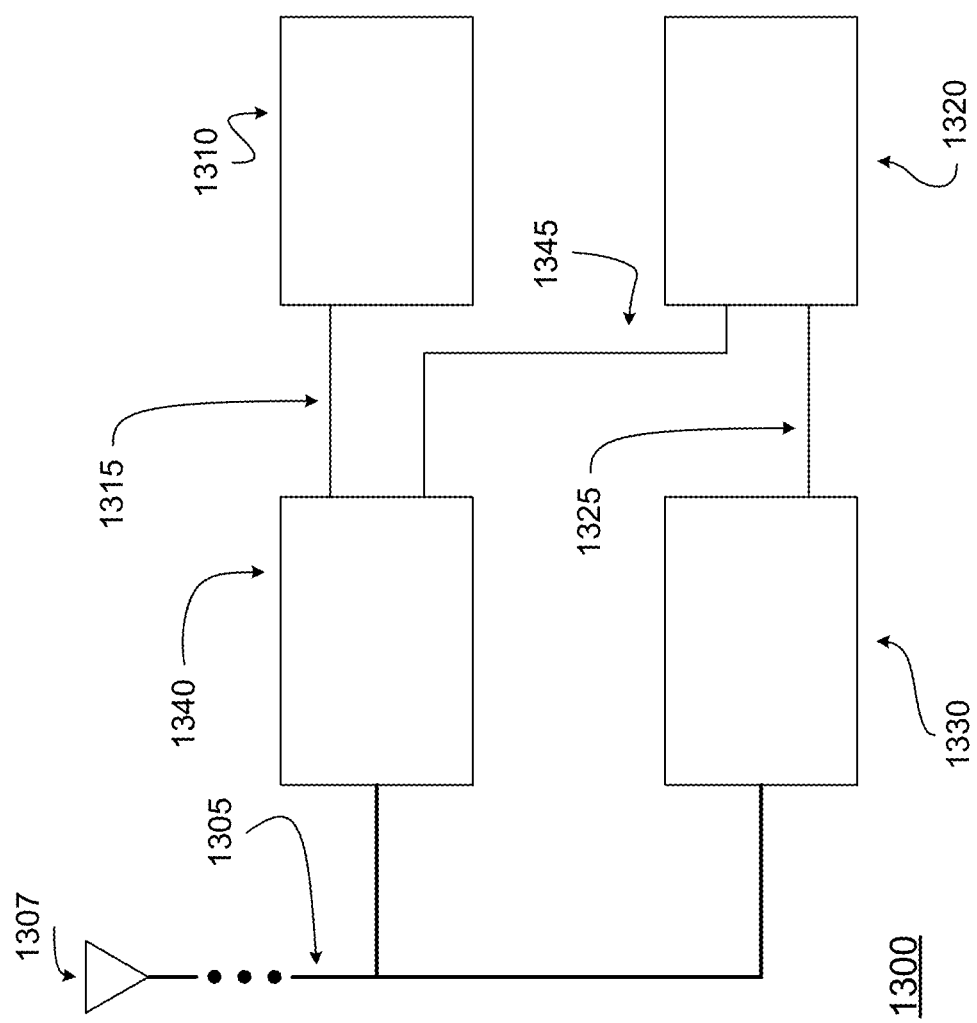
FIG. 13 illustrates hardware processing circuitry for a UE for flexible radio resource management signaling, in accordance with some embodiments of the disclosure.

FIG. 13 illustrates hardware processing circuitry for a UE for flexible radio resource management signaling, in accordance with some embodiments of the disclosure. A hardware processing circuitry 1300 may comprise logic devices and/or circuitry operable to perform various operations. For example, with reference to FIGS. 11 and 13, UE 1130 (or various elements or components therein, such as hardware processing circuitry 1140, or combinations of elements or components therein) may include part of, or all of, hardware processing circuitry 1300. In some embodiments, processor 1136 and memory 1138 (and/or other elements or components of UE 1130) may be arranged to perform various operations of hardware processing circuitry 1300, such as operations described herein with reference to devices and circuitry within hardware processing circuitry 1300. For example, one or more devices or circuits of hardware processing circuitry 1300 may be implemented by combinations of software-configured elements and/or other hardware elements.

In some embodiments, hardware processing circuitry 1300 may comprise one or more antenna ports 1305 operable to provide various transmissions over a wireless communication channel (such as wireless communication channel 1150). Antenna ports 1305 may be coupled to one or more antennas 1307 (which may be antennas 1105). In some embodiments, hardware processing circuitry 1300 may incorporate antennas 1307, while in other embodiments, hardware processing circuitry 1300 may merely be coupled to antennas 1307.

Antenna ports 1305 and antennas 1307 may be operable to provide signals from a UE to a wireless communications channel and/or an eNB, and may be operable to provide signals from an eNB and/or a wireless communications channel to a UE. For example, antenna ports 1305 and antennas 1307 may be operable to provide transmissions from UE 1130 to wireless communication channel 1150 (and from there to eNB 1110, or to another eNB). Similarly, antennas 1307 and antenna ports 1305 may be operable to provide transmissions from a wireless communication channel 1150 (and beyond that, from eNB 1110, or another eNB) to UE 1130.

An apparatus of UE 1130 (or another UE or mobile handset) may be operable to communicate with an eNB on a wireless network, and may comprise hardware processing circuitry 1300. In some embodiments, the UE (or other mobile handset) may be a device comprising an application processor, a memory, one or more antennas, a wireless interface for allowing the application processor to communicate with another device, and a touch-screen display.

With reference to FIG. 13, hardware processing circuitry 1300 may comprise a first circuitry 1310, a second circuitry 1320, a third circuitry 1330, and a fourth circuitry 1340. First circuitry 1310 may be operable to establish an RRC_Connection with an eNB such as eNB 1110 (or another eNB). The RRC_Connection may be established by one or more transmissions provided to fourth circuitry 1340 over an RRC_Connection interface 1315.

Second circuitry 1320 may be operable to provide a partition support transmission for eNB 1110 listing one or more service-specific resource partitions supported by UE 1230 within a wireless cellular communications system bandwidth. The partition support transmission may be provided to third circuitry 1330 over a partition support interface 1325. Third circuitry 1330 may then be operable to transmit the partition support transmission to eNB 1110.

In some embodiments, one or more of the service-specific resource partitions has a resource-block definition that differs from a legacy LTE resource-block definition with respect to at least one of: a subcarrier spacing, a TTI, a number of OFDM symbols per TTI, a number of subcarriers per RB, a bandwidth per RB, a number of REs per RB, and a cyclic prefix length. For various embodiments, one or more of the service-specific resource partitions may be a secondary partition.

Fourth circuitry 1340 may be operable to receive a partition configuration transmission configuring one or more of the service-specific resource partitions. The partition configuration transmission may be received from antenna ports 1305 and/or antennas 1307. In some embodiments, fourth circuitry 1340 may be operable to receive an SIB transmission from eNB 1110, which it may then forward to second circuitry 1320 over a partition configuration interface 1345. The SIB transmission may include resource allocation information about at least one of the secondary partitions.

In some embodiments, fourth circuitry 1340 may be operable to receive a resource-partition-specific PBCH transmission from eNB 1110. In various embodiments, fourth circuitry 1340 may be operable to receive a plurality of PBCH transmissions from eNB 1110 at a first rate of repetition under a first degree of coverage extension, and may be operable to receive a plurality of PBCH transmissions from eNB 1110 at a second rate of repetition under a second degree of coverage extension. The second rate of repetition may be greater than the first rate of repetition, and the second degree of coverage extension may be greater than the first degree of coverage extension.

In various embodiments, fourth circuitry 1340 may be operable to receive a set of xPDCCH transmissions for one of the service-specific resource partitions from eNB 1110. In such embodiments, the set of xPDCCH transmissions may include one or more of: a resource block type of the service-specific resource partition; a resource allocation of the service-specific resource partition; and a quasi-collocated partition-specific CSI-RS configuration.

In some embodiments, fourth circuitry 1340 may be operable to receive a primary resource partition request transmission from eNB 1110. In such embodiments, the primary resource partition request transmission may include one or more of: a resource block type of the service-specific resource partition; an SS ID defining a partition ID; a supported degree of PBCH coverage extension; a resource allocation for SS and PBCH transmissions; and a partition-specific CSI-RS configuration.

In some embodiments, first circuitry 1310, second circuitry 1320, third circuitry 1330, and fourth circuitry 1340 may be implemented as separate circuitries. In other embodiments, one or more of first circuitry 1310, second circuitry 1320, third circuitry 1330, and fourth circuitry 1340 may be combined and implemented together in a circuitry without altering the essence of the embodiments. In various embodiments, processor 1136 (and/or one or more other processors which UE 1130 may comprise) may be arranged to perform the operations of first circuitry 1310, second circuitry 1320, third circuitry 1330, and/or fourth circuitry 1340. In such embodiments, first circuitry 1310, second circuitry 1320, third circuitry 1330, and/or fourth circuitry 1340 may accordingly be implemented by various combinations of software-configured elements (e.g., processor 1136, and/or one or more other processors) and/or other hardware elements. In various embodiments, processor 1136 (and/or one or more other processors which UE 1130 may comprise) may be a baseband processor.

Figure 14:
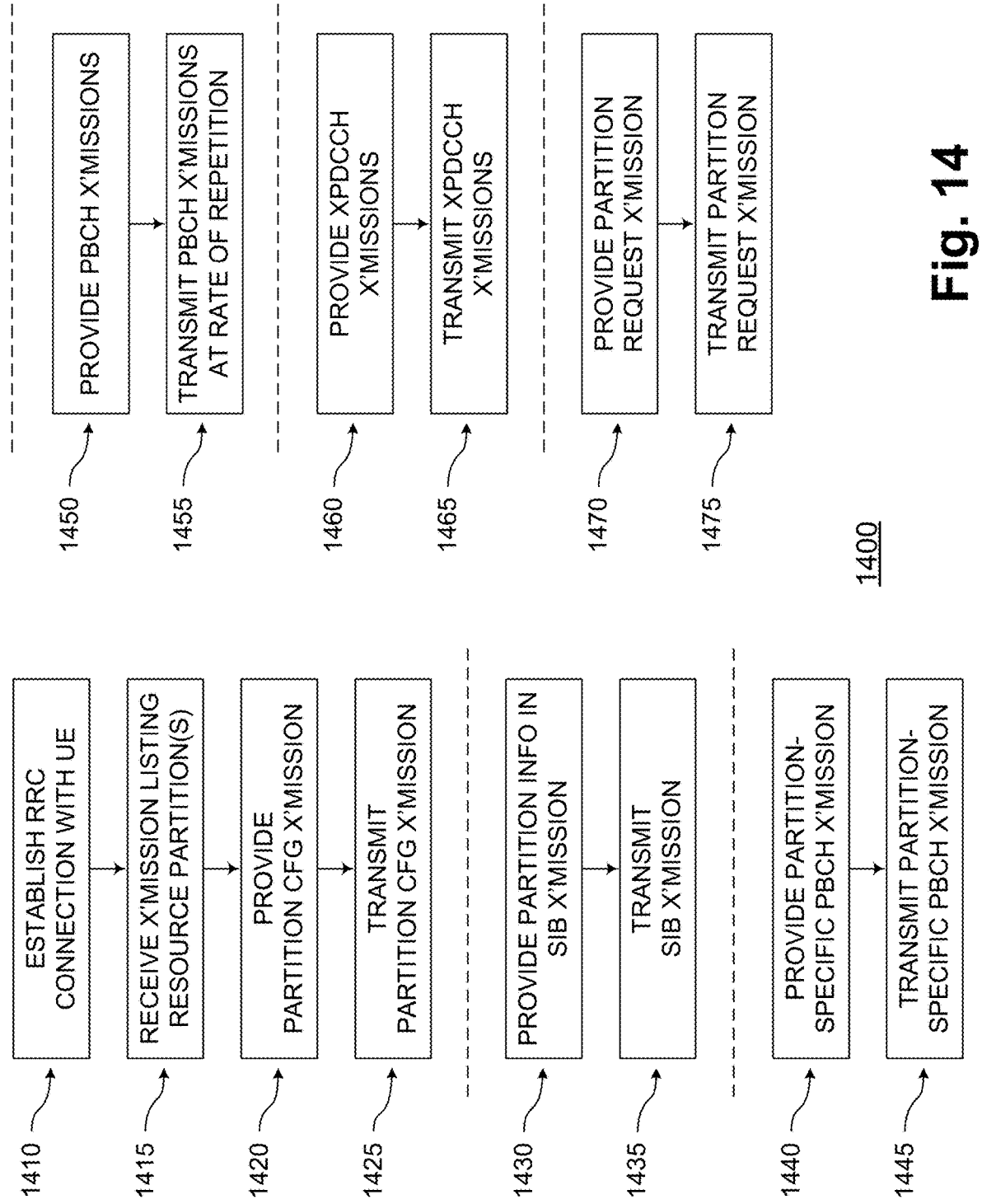
FIG. 14 illustrates methods for an eNB for flexible radio resource management signaling, in accordance with some embodiments of the disclosure.

FIG. 14 illustrates methods for an eNB for flexible radio resource management signaling, in accordance with some embodiments of the disclosure. A method 1400 may comprise an establishing 1410, a receiving 1415, a providing 1420, and a transmitting 1425. In establishing 1410, an RRC_Connection with a UE such as UE 1130 (or another UE) may be established for an eNB such as eNB 1110 (or another eNB). In receiving 1415, a transmission from UE 1130 may be received listing one or more service-specific resource partitions supported by UE 1130 within a wireless cellular communications system bandwidth. In providing 1420, a partition configuration transmission configuring one or more of the service-specific resource partitions may be provided. In transmitting 1425, the partition configuration transmission may be transmitted to UE 1130.

In various embodiments of method 1400, one or more of the service-specific resource partitions may have a resource-block definition that differs from a legacy LTE resource-block definition with respect to at least one of: a subcarrier spacing, a TTI, a number of OFDM symbols per TTI, a number of subcarriers per RB, a bandwidth per RB, a number of REs per RB, and a cyclic prefix length.

Some embodiments of method 1400 may comprise a providing 1430 and a transmitting 1435, in which one or more of the service-specific resource partitions may be secondary partitions. In providing 1430, resource allocation information about at least one of the secondary partitions may be provided in an SIB transmission. In transmitting 1435, the SIB transmission may be transmitted to UE 1130 in a primary partition.

In various embodiments, method 1400 may also comprise a providing 1440 and a transmitting 1445. In providing 1440, a resource-partition-specific PBCH transmission may be provided, and in transmitting 1445, the resource-partition-specific PBCH transmission may be transmitted to UE 1130. Similarly, method 1400 may comprise a providing 1450 and a transmitting 1455 in some embodiments. In providing 1450, a plurality of PBCH transmissions may be provided, and in transmitting 1455, the PBCH transmissions may be transmitted to UE 1130 at a first rate of repetition when under a first degree of coverage extension, and transmitted to UE 1130 at a second rate of repetition when under a second degree of coverage extension. In such embodiments, the second rate of repetition may be greater than the first rate of repetition, and the second degree of coverage extension may be greater than the first degree of coverage extension.

In some embodiments, method 1400 may comprise a providing 1460 and a transmitting 1465. In providing 1460, a set of xPDCCH transmissions may be provided for one of the service-specific resource partitions, while in transmitting 1465, the set of xPDCCH transmissions may be transmitted to UE 1130. In such embodiments, the set of xPDCCH transmissions may include one or more of: a Resource Block type of the service-specific resource partition; a resource allocation of the service-specific resource partition; and a quasi-collocated partition-specific CSI-RS configuration.

Some embodiments of method 1400 may comprise a providing 1470 and a transmitting 1475. In providing 1470, a primary resource partition request transmission may be provided, and in transmitting 1475, the primary resource partition request transmission may be transmitted to a UE 1130. In such embodiments, the primary resource partition request transmission may include one or more of: a Resource Block type of the service-specific resource partition; an SS ID defining a partition ID; a supported degree of PBCH coverage extension; a resource allocation for SS and PBCH transmissions; and a partition-specific CSI-RS configuration.

Figure 15:
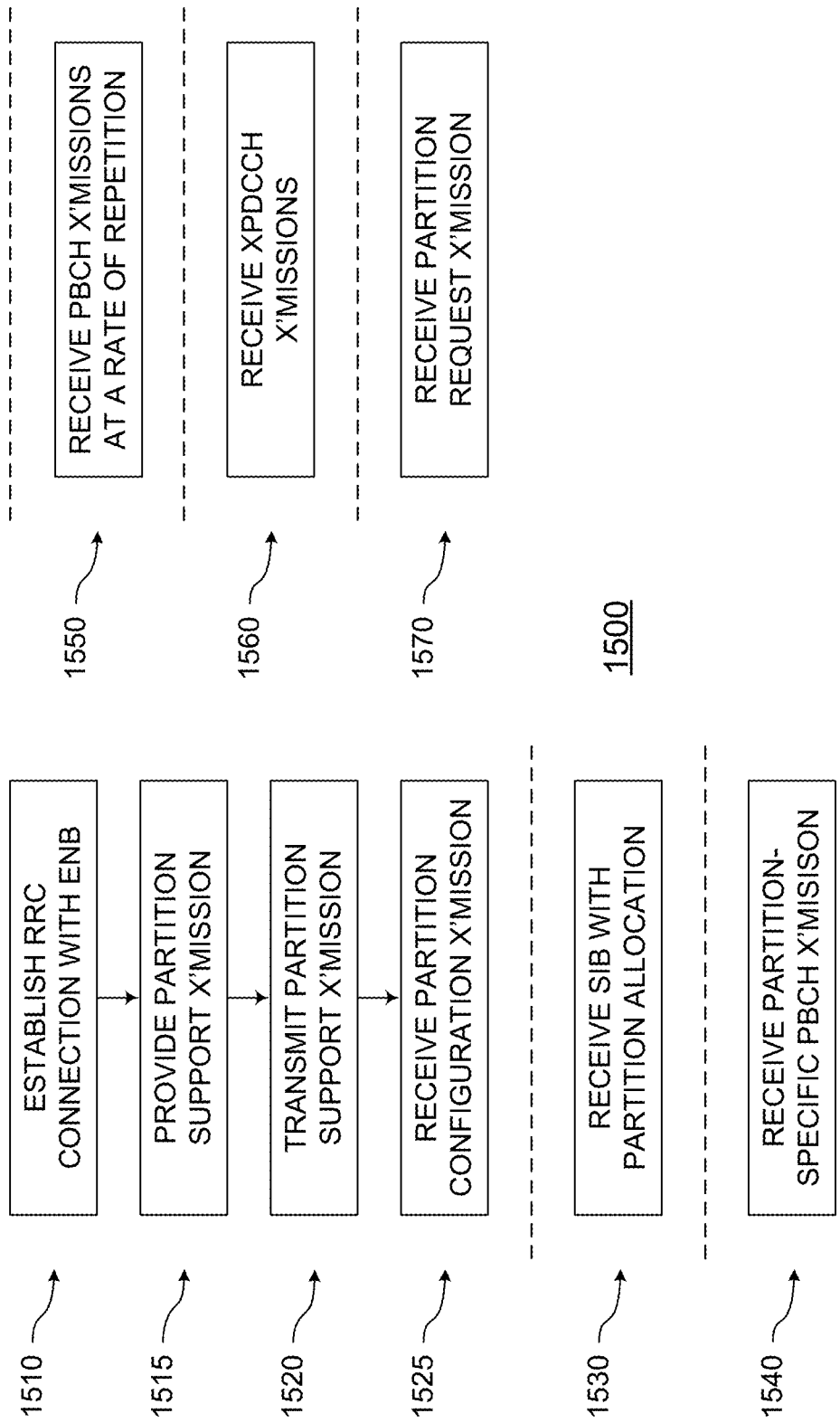
FIG. 15 illustrates methods for an UE for flexible radio resource management signaling, in accordance with some embodiments of the disclosure.

FIG. 15 illustrates methods for a UE for flexible radio resource management signaling, in accordance with some embodiments of the disclosure. A method 1500 may comprise an establishing 1510, a providing 1515, a transmitting 1520, and a receiving 1525. In establishing 1510, an RRC_Connection with an eNB such as eNB 1110 (or another eNB) may be established for a UE such as UE 1130 (or another UE). In providing 1515, a partition support transmission for eNB 1110 may be provided, the partition support transmission listing one or more service-specific resource partitions supported by UE 1130 within a wireless cellular communications system bandwidth. In transmitting 1520, the partition support transmission may be transmitted to eNB 1110. In receiving 1525, a partition configuration transmission configuring one or more of the service-specific resource partitions may be received.

In various embodiments of method 1500, one or more of the service-specific resource partitions may have a resource-block definition that differs from a legacy LTE resource-block definition with respect to at least one of: a subcarrier spacing, a TTI, a number of OFDM symbols per TTI, a number of subcarriers per RB, a bandwidth per RB, a number of REs per RB, and a cyclic prefix length. In some embodiments of method 1500, one or more of the service-specific resource partitions may be secondary partitions Various embodiments of method 1500 may comprise one or more of a receiving 1530, a receiving 1540, a receiving 1550, a receiving 1560, and/or a receiving 1570. In receiving 1530, an SIB transmission may be received from eNB 1110. The SIB transmission may include resource allocation information about at least one of the secondary partitions.

In receiving 1540, a resource-partition-specific PBCH transmission may be received from eNB 1110. In receiving 1550, a plurality of PBCH transmissions may be received from eNB 1110 at a first rate of repetition when under a first degree of coverage extension, and a plurality of PBCH transmissions may be received from eNB 1110 at a second rate of repetition when under a second degree of coverage extension. In such embodiments, the second rate of repetition may be greater than the first rate of repetition, and the second degree of coverage extension may be greater than the first degree of coverage extension.

In receiving 1560, a set of xPDCCH transmissions from eNB 1110 may be received for one of the service-specific resource partitions. The set of xPDCCH transmissions may include one or more of: a Resource Block type of the service-specific resource partition; a resource allocation of the service-specific resource partition; and a quasi-collocated partition-specific CSI-RS configuration.

Finally, in receiving 1570, a primary resource partition request transmission may be received from eNB 1110. The primary resource partition request transmission may include one or more of: a Resource Block type of the service-specific resource partition; an SS ID defining a partition ID; a supported degree of PBCH coverage extension; a resource allocation for SS and PBCH transmissions; and a partition-specific CSI-RS configuration.

Although the actions in the flowchart with reference to FIGS. 14 and 15 are shown in a particular order, the order of the actions can be modified. Thus, the illustrated embodiments can be performed in a different order, and some actions may be performed in parallel. Some of the actions and/or operations listed in FIGS. 14 and 15 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 1110 and/or hardware processing circuitry 1120 to perform an operation comprising method 1400. Similarly, in some embodiments, machine readable storage media may have executable instructions that, when executed, cause UE 1130 and/or hardware processing circuitry 1140 to perform an operation comprising method 1500. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 16:
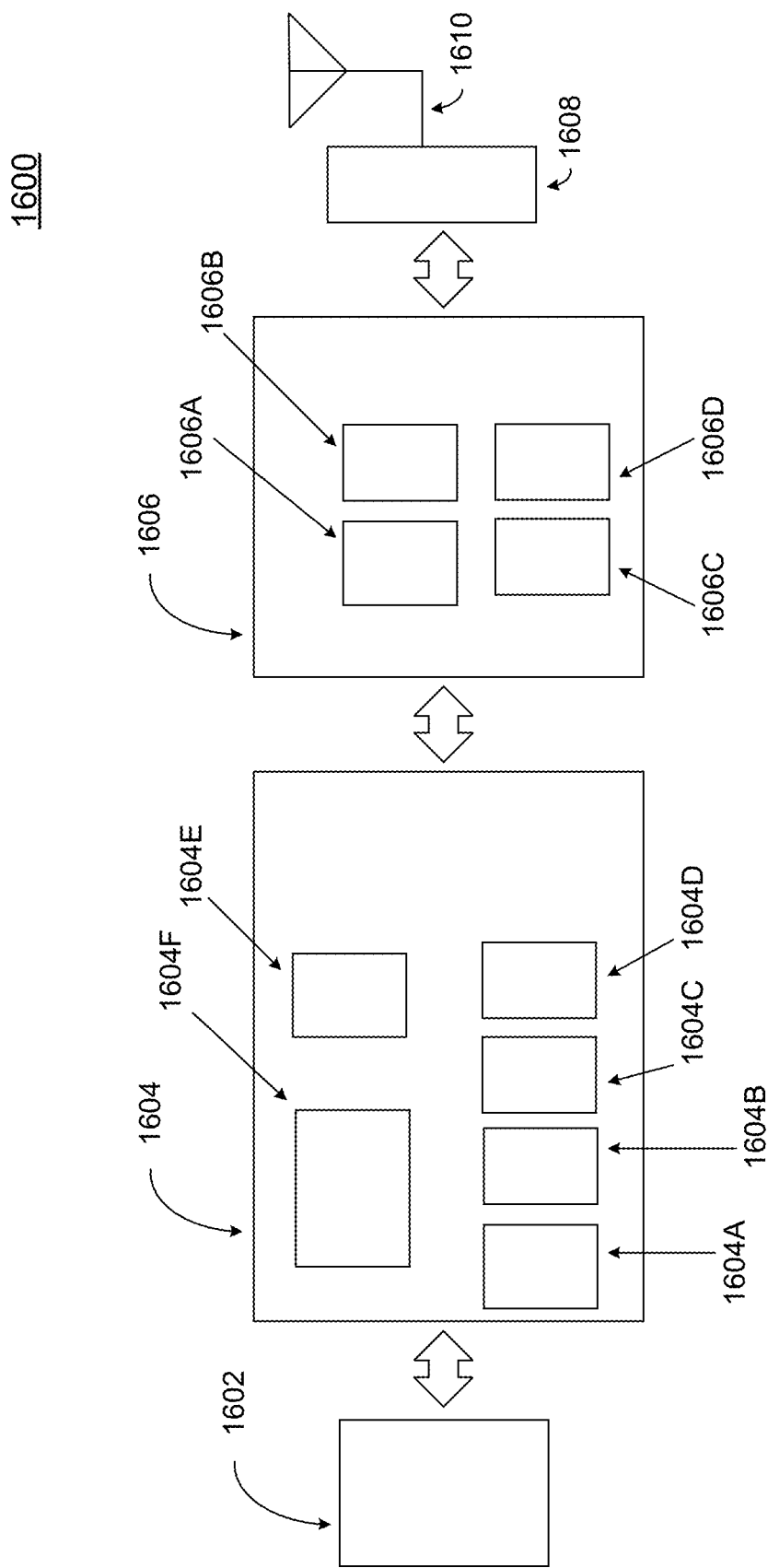
FIG. 16 illustrates example components of a UE device, in accordance with some embodiments of the disclosure.

FIG. 16 illustrates example components of a UE device 1600, in accordance with some embodiments of the disclosure. In some embodiments, the UE device 1600 may include application circuitry 1602, baseband circuitry 1604, Radio Frequency (RF) circuitry 1606, front-end module (FEM) circuitry 1608, a low-power wake-up receiver (LP-WUR), and one or more antennas 1610, coupled together at least as shown. In some embodiments, the UE device 1600 may include additional elements such as, for example, memory/storage, display, camera, sensor, and/or input/output (I/O) interface.

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1604 may include circuitry such as, but not limited to, one or more single-core or multi-core processors. The baseband circuitry 1604 may include one or more baseband processors and/or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a second generation (2G) baseband processor 1604a, third generation (3G) baseband processor 1604b, fourth generation (4G) baseband processor 1604c, and/or other baseband processor(s) 1604d for other existing generations, generations in development or to be developed in the future (e.g., fifth generation (5G), 6G, etc.). The baseband circuitry 1604 (e.g., one or more of baseband processors 1604a-d) may handle various radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, and/or constellation mapping/demapping functionality. In some embodiments, encoding/decoding circuitry of the baseband circuitry 1604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1604e of the baseband circuitry 1604 may be configured to run elements of the protocol stack for signaling of the PHY, MAC, RLC, PDCP and/or RRC layers. In some embodiments, the baseband circuitry may include one or more audio digital signal processor(s) (DSP) 1604f. The audio DSP(s) 1604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606a, amplifier circuitry 1606b and filter circuitry 1606c. The transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c. The filter circuitry 1606c may include a low-pass filter (LPF), although the scope of the embodiments is not limited in this respect.

In some embodiments, the mixer circuitry 1606a of the receive signal path and the mixer circuitry 1606a of the transmit signal path may include two or more mixers and may be arranged for quadrature downconversion and/or upconversion respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and/or direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610.

In some embodiments, the UE 1600 comprises a plurality of power saving mechanisms. If the UE 1600 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1600 may transition off to an RRC_Idle state, where it disconnects from the network and does not perform operations such as channel quality feedback, handover, etc. The UE 1600 goes into a very low power state and it performs paging where again it periodically wakes up to listen to the network and then powers down again. Since the device might not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of an Evolved Node B (eNB) operable to communicate with a User Equipment (UE) on a wireless network, comprising: one or more processors to: establish a Radio Resource Control (RRC) Connection with a UE; process a transmission from the UE listing one or more service-specific resource partitions supported by the UE within a wireless cellular communications system bandwidth; and generate a partition configuration transmission for the UE configuring the one or more service-specific resource partitions.

In example 2, the apparatus of example 1, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 3, the apparatus of either of examples 1 or 2, wherein the one or more service-specific resource partitions are secondary partitions; wherein the one or more processors are to generate resource allocation information about at least one of the secondary partitions in a System Information Block (SIB) transmission for the UE in a primary partition.

In example 4, the apparatus of any of examples 1 through 3, wherein the one or more processors are to generate a resource-partition-specific Physical Broadcast Channel (PBCH) transmission for the UE.

In example 5, the apparatus of any of examples 1 through 4, wherein the one or more processors are to generate a plurality of Physical Broadcast Channel (PBCH) transmissions for the UE at a first rate of repetition under a first degree of coverage extension; wherein the one or more processors are to generate the plurality of PBCH transmissions to the UE at a second rate of repetition under a second degree of coverage extension; wherein the second degree of coverage extension is greater than the first degree of coverage extension; and wherein the second rate of repetition is greater than the first rate of repetition.

In example 6, the apparatus of any of examples 1 through 5, wherein the one or more processors are to generate a set of Extended Physical Downlink Control Channel (xPDCCH) transmissions for the UE, for one of the service-specific resource partitions; and wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 7, the apparatus of any of examples 1 through 6, wherein the one or more processors are to generate a primary resource partition request transmission for the UE; and wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 8 provides an eNB device comprising an application processor, a memory, one or more antenna ports, and an interface for allowing the application processor to communicate with another device, the eNB device including the apparatus of any of examples 1 through 7.

Example 9 provides machine readable storage media having machine executable instructions that, when executed, cause one or more processors to perform an operation comprising: establish, for an Evolved Node B (eNB), a Radio Resource Control (RRC) Connection with a UE; process a transmission from the UE listing one or more service-specific resource partitions supported by the UE within a wireless cellular communications system bandwidth; generate a partition configuration transmission for the UE, the partition configuration transmission configuring the one or more service-specific resource partitions.

In example 10, the machine readable storage media of example 9, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 11, the machine readable storage media of either of examples 9 or 10, wherein the one or more service-specific resource partitions are secondary partitions, the operation comprising: generate resource allocation information about at least one of the secondary partitions in a System Information Block (SIB) transmission for the UE in a primary partition.

In example 12, the machine readable storage media of any of examples 9 through 11, the operation comprising: generate a resource-partition-specific Physical Broadcast Channel (PBCH) transmission for the UE.

In example 13, the machine readable storage media of any of examples 9 through 12, the operation comprising: generate a plurality of Physical Broadcast Channel (PBCH) transmissions for the UE at a first rate of repetition when under a first degree of coverage extension; and generate the plurality of PBCH transmissions for the UE at a second rate of repetition when under a second degree of coverage extension, wherein the second degree of coverage extension is greater than the first degree of coverage extension, and wherein the second rate of repetition is greater than the first rate of repetition.

In example 14, the machine readable storage media of any of examples 9 through 13, the operation comprising: generate a set of Extended Physical Downlink Control Channel (xPDCCH) transmissions for the UE, for one of the service-specific resource partitions, wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 15, the machine readable storage media of any of examples 9 through 14, the operation comprising: generate a primary resource partition request transmission for the UE; wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 16 provides a method comprising: establishing, for an Evolved Node B (eNB), a Radio Resource Control (RRC) Connection with a UE; processing a transmission from the UE listing one or more service-specific resource partitions supported by the UE within a wireless cellular communications system bandwidth; generating a partition configuration transmission for the UE, the partition configuration transmission configuring the one or more service-specific resource partitions.

In example 17, the method of example 16, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 18, the method of either of examples 16 or 17, wherein the one or more service-specific resource partitions are secondary partitions, the method comprising: generating resource allocation information about at least one of the secondary partitions in a System Information Block (SIB) transmission for the UE in a primary partition.

In example 19, the method of any of examples 16 through 18, the method comprising: generating a resource-partition-specific Physical Broadcast Channel (PBCH) transmission for the UE.

In example 20, the method of any of examples 16 through 19, the method comprising: generating a plurality of Physical Broadcast Channel (PBCH) transmissions for the UE at a first rate of repetition when under a first degree of coverage extension; and generating the plurality of PBCH transmissions for the UE at a second rate of repetition when under a second degree of coverage extension, wherein the second degree of coverage extension is greater than the first degree of coverage extension, and wherein the second rate of repetition is greater than the first rate of repetition.

In example 21, the method of any of examples 16 through 20, the method comprising: generating a set of Extended Physical Downlink Control Channel (xPDCCH) transmissions for the UE, for one of the service-specific resource partitions, wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 22, the method of any of examples 16 through 21, the method comprising: generating a primary resource partition request transmission for the UE; wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 23 provides machine readable storage media having machine executable instructions stored thereon that, when executed, cause one or more processors to perform a method according to any one of examples 16 through 22.

Example 24 provides an apparatus of an Evolved Node B (eNB) operable to communicate with a User Equipment (UE) on a wireless network, comprising: means for establishing a Radio Resource Control (RRC) Connection with a UE; means for processing a transmission from the UE listing one or more service-specific resource partitions supported by the UE within a wireless cellular communications system bandwidth; means for generating a partition configuration transmission for the UE, the partition configuration transmission configuring the one or more service-specific resource partitions.

In example 25, the apparatus of example 24, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 26, the apparatus of either of examples 24 or 25, wherein the one or more service-specific resource partitions are secondary partitions, the method comprising: means for generating resource allocation information about at least one of the secondary partitions in a System Information Block (SIB) transmission for the UE in a primary partition.

In example 27, the apparatus of any of examples 24 through 26, the method comprising: means for generating a resource-partition-specific Physical Broadcast Channel (PBCH) transmission for the UE.

In example 28, the apparatus of any of examples 24 through 27, the method comprising: means for generating a plurality of Physical Broadcast Channel (PBCH) transmissions for the UE at a first rate of repetition when under a first degree of coverage extension; and means for generating the plurality of PBCH transmissions for the UE at a second rate of repetition when under a second degree of coverage extension, means for wherein the second degree of coverage extension is greater than the first degree of coverage extension, and means for wherein the second rate of repetition is greater than the first rate of repetition.

In example 29, the apparatus of any of examples 24 through 28, the method comprising: means for generating a set of Extended Physical Downlink Control Channel (xPDCCH) transmissions for the UE, for one of the service-specific resource partitions, wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 30, the apparatus of any of examples 24 through 29, the method comprising: means for generating a primary resource partition request transmission for the UE; wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 31 provides an apparatus of a User Equipment (UE) operable to communicate with an Evolved Node B (eNB) on a wireless network, comprising: one or more processors to: establish a Radio Resource Control (RRC) Connection with an eNB; generate a partition support transmission for the eNB listing one or more service-specific resource partitions supported by the UE within a wireless cellular communications system bandwidth; and process a partition configuration transmission configuring the one or more service-specific resource partitions.

In example 32, the apparatus of example 31, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 33, the apparatus of either of examples 31 or 32, wherein the one or more service-specific resource partitions are secondary partitions; and wherein the one or more processors are to process a System Information Block (SIB) transmission from the eNB, the SIB transmission including resource allocation information about at least one of the secondary partitions.

In example 34, the apparatus of any of examples 31 through 33, wherein the one or more processors are to process a resource-partition-specific Physical Broadcast Channel (PBCH) transmission from the eNB.

In example 35, the apparatus of any of examples 31 through 34, wherein the one or more processors are to process a first plurality of Physical Broadcast Channel (PBCH) transmissions from the eNB at a first rate of repetition under a first degree of coverage extension; wherein the one or more processors are to process a second plurality of PBCH transmissions from the eNB at a second rate of repetition under a second degree of coverage extension; wherein the second degree of coverage extension is greater than the first degree of coverage extension; and wherein the second rate of repetition is greater than the first rate of repetition.

In example 36, the apparatus of any of examples 31 through 35, wherein the one or more processors are to process a set of Extended Physical Downlink Control Channel (xPDCCH) transmissions for one of the service-specific resource partitions from the eNB; and wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 37, the apparatus of any of examples 31 through 36, wherein the one or more processors are to process a primary resource partition request transmission from the eNB; and wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 38 provides a UE device comprising an application processor, a memory, one or more antennas, a wireless interface for allowing the application processor to communicate with another device, and a touch-screen display, the UE device including the apparatus of any of examples 31 through 37.

Example 39 provides machine readable storage media having machine executable instructions that, when executed, cause one or more processors to perform an operation comprising: establish, for a User Equipment (UE), a Radio Resource Control (RRC) Connection with an Evolved Node-B (eNB); generate a partition support transmission for the eNB listing one or more service-specific resource partitions supported by the UE within a wireless cellular communications system bandwidth; and process a partition configuration transmission configuring the one or more service-specific resource partitions.

In example 40, the machine readable storage media of example 39, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 41, the machine readable storage media of either of examples 39 or 40, wherein the one or more service-specific resource partitions are secondary partitions, the operation comprising: process a System Information Block (SIB) transmission from the eNB, the SIB transmission including resource allocation information about at least one of the secondary partitions.

In example 42, the machine readable storage media of any of examples 39 through 41, the operation comprising: process a resource-partition-specific Physical Broadcast Channel (PBCH) transmission from the eNB.

In example 43, the machine readable storage media of any of examples 39 through 42, the operation comprising: process a first plurality of Physical Broadcast Channel (PBCH) transmissions from the eNB at a first rate of repetition when under a first degree of coverage extension; and process a second plurality of PBCH transmissions from the eNB at a second rate of repetition when under a second degree of coverage extension, wherein the second degree of coverage extension is greater than the first degree of coverage extension; and wherein the second rate of repetition is greater than the first rate of repetition.

In example 44, the machine readable storage media of any of examples 39 through 43, the operation comprising: process a set of Extended Physical Downlink Control Channel (xPDCCH) transmissions for one of the service-specific resource partitions from the eNB, wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 45, the machine readable storage media of any of examples 39 through 44, the operation comprising: process a primary resource partition request transmission from the eNB, wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 46 provides a method comprising: establishing, for a User Equipment (UE), a Radio Resource Control (RRC) Connection with an Evolved Node-B (eNB); generating a partition support transmission for the eNB listing one or more service-specific resource partitions supported by the UE within a wireless cellular communications system bandwidth; and processing a partition configuration transmission configuring the one or more service-specific resource partitions.

In example 47, the method of example 46, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 48, the method of either of examples 46 or 47, wherein the one or more service-specific resource partitions are secondary partitions, the method comprising: processing a System Information Block (SIB) transmission from the eNB, the SIB transmission including resource allocation information about at least one of the secondary partitions.

In example 49, the method of any of examples 46 through 48, the method comprising: processing a resource-partition-specific Physical Broadcast Channel (PBCH) transmission from the eNB.

In example 50, the method of any of examples 46 through 49, the method comprising: processing a first plurality of Physical Broadcast Channel (PBCH) transmissions from the eNB at a first rate of repetition when under a first degree of coverage extension; and processing a second plurality of PBCH transmissions from the eNB at a second rate of repetition when under a second degree of coverage extension, wherein the second degree of coverage extension is greater than the first degree of coverage extension; and wherein the second rate of repetition is greater than the first rate of repetition.

In example 51, the method of any of examples 46 through 50, the operation comprising: processing a set of Extended Physical Downlink Control Channel (xPDCCH) transmissions for one of the service-specific resource partitions from the eNB, wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 52, the method of any of examples 46 through 51, the method comprising: processing a primary resource partition request transmission from the eNB, wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

Example 53 provides a machine readable storage media having machine executable instructions stored thereon that, when executed, cause one or more processors to perform a method according to any one of examples 46 through 52.

Example 54 provides an apparatus of a User Equipment (UE) operable to communicate with an Evolved Node B (eNB) on a wireless network, comprising: means for establishing a Radio Resource Control (RRC) Connection with an Evolved Node-B (eNB); means for generating a partition support transmission for the eNB listing one or more service-specific resource partitions supported by the UE within a wireless cellular communications system bandwidth; and means for processing a partition configuration transmission configuring the one or more service-specific resource partitions.

In example 55, the apparatus of example 54, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

In example 56, the apparatus of either of examples 54 or 55, wherein the one or more service-specific resource partitions are secondary partitions, the method comprising: means for processing a System Information Block (SIB) transmission from the eNB, the SIB transmission including resource allocation information about at least one of the secondary partitions.

In example 57, the apparatus of any of examples 54 through 56, the method comprising: means for processing a resource-partition-specific Physical Broadcast Channel (PBCH) transmission from the eNB.

In example 58, the apparatus of any of examples 54 through 57, the method comprising: means for processing a first plurality of Physical Broadcast Channel (PBCH) transmissions from the eNB at a first rate of repetition when under a first degree of coverage extension; and means for processing a second plurality of PBCH transmissions from the eNB at a second rate of repetition when under a second degree of coverage extension, wherein the second degree of coverage extension is greater than the first degree of coverage extension; and wherein the second rate of repetition is greater than the first rate of repetition.

In example 59, the apparatus of any of examples 54 through 58, the operation comprising: processing a set of Extended Physical Downlink Control Channel (xPDCCH) transmissions for one of the service-specific resource partitions from the eNB, wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

In example 60, the apparatus of any of examples 54 through 59, the method comprising: means for processing a primary resource partition request transmission from the eNB, wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

In example 61, the apparatus of any of examples 1 through 7, 24 through 30, 31 through 37, and 54 through 60, wherein the one or more processors comprise a baseband processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of an Evolved Node-B (eNB) operable to communicate with a User Equipment (UE) on a wireless network, comprising:
one or more processors to:
establish a Radio Resource Control (RRC) Connection with a UE;
process a transmission from the UE listing one or more service-specific resource partitions supported by the UE within a wireless cellular communications system bandwidth;
generate a partition configuration transmission for the UE configuring the one or more service-specific resource partitions;
generate a plurality of Physical Broadcast Channel (PBCH) transmissions for the UE at a first rate of repetition when under a first degree of coverage extension; and
generate the plurality of PBCH transmissions for the UE at a second rate of repetition when under a second degree of coverage extension,
wherein the second degree of coverage extension is greater than the first degree of coverage extension, and the second rate of repetition is greater than the first rate of repetition.

2. The apparatus of claim 1,
wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

3. The apparatus of claim 1,
wherein the one or more service-specific resource partitions are secondary partitions;
wherein the one or more processors are to generate resource allocation information about at least one of the secondary partitions in a System Information Block (SIB) transmission for the UE in a primary partition.

4. The apparatus of claim 1,
wherein the one or more processors are to generate a resource-partition-specific Physical Broadcast Channel (PBCH) transmission for the UE.

5. The apparatus of claim 1,
wherein the one or more processors are to generate a set of Extended Physical Downlink Control Channel (xPDCCH) transmissions for the UE, for one of the service-specific resource partitions; and
wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

6. The apparatus of claim 1,
wherein the one or more processors are to generate a primary resource partition request transmission for the UE; and
wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

7. An eNB device comprising an application processor, a memory, one or more antenna ports, and an interface for allowing the application processor to communicate with another device, the eNB device including the apparatus of claim 1.

8. The apparatus of claim 1, wherein the one or more processors are further configured to cause the eNB to transmit the plurality of PBCH transmissions to the UE, and wherein the plurality of PBCH transmissions are consistent with the partition configuration transmission.

9. Machine readable storage media having machine executable instructions that, when executed, cause one or more processors to perform an operation comprising:
establish, for an Evolved Node-B (eNB), a Radio Resource Control (RRC) Connection with a UE;
process a transmission from the UE listing one or more service-specific resource partitions supported by the UE within a wireless cellular communications system bandwidth;
generate a partition configuration transmission for the UE, the partition configuration transmission configuring the one or more service-specific resource partitions;
generate a plurality of Physical Broadcast Channel (PBCH) transmissions for the UE at a first rate of repetition when under a first degree of coverage extension; and
generate the plurality of PBCH transmissions for the UE at a second rate of repetition when under a second degree of coverage extension,
wherein the second degree of coverage extension is greater than the first degree of coverage extension, and the second rate of repetition is greater than the first rate of repetition.

10. The machine readable storage media of claim 9, wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

11. The machine readable storage media of claim 9, wherein the one or more service-specific resource partitions are secondary partitions, the operation comprising:
generate resource allocation information about at least one of the secondary partitions in a System Information Block (SIB) transmission for the UE in a primary partition.

12. The machine readable storage media of any of claim 9, the operation comprising:
generate a resource-partition-specific Physical Broadcast Channel (PBCH) transmission for the UE.

13. The machine readable storage media of claim 9, wherein the operation further comprises: cause the eNB to transmit the plurality of PBCH transmissions to the UE, and wherein the plurality of PBCH transmissions are consistent with the partition configuration transmission.

14. An apparatus of a User Equipment (UE) operable to communicate with an Evolved Node-B (eNB) on a wireless network, comprising:

one or more processors to:
- establish a Radio Resource Control (RRC) Connection with an eNB;
- generate a partition support transmission for the eNB listing one or more service-specific resource partitions supported by the UE within a wireless cellular communications system bandwidth;
- process a partition configuration transmission configuring the one or more service-specific resource partitions;
- process a first plurality of Physical Broadcast Channel (PBCH) transmissions from the eNB at a first rate of repetition when under a first degree of coverage extension; and
- process a second plurality of PBCH transmissions from the eNB at a second rate of repetition when under a second degree of coverage extension,
- wherein the second degree of coverage extension is greater than the first degree of coverage extension, and the second rate of repetition is greater than the first rate of repetition.

15. The apparatus of claim 14,
wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

16. The apparatus of claim 14,
wherein the one or more service-specific resource partitions are secondary partitions; and
wherein the one or more processors are to process a System Information Block (SIB) transmission from the eNB, the SIB transmission including resource allocation information about at least one of the secondary partitions.

17. The apparatus of claim 14,
wherein the one or more processors are to process a resource-partition-specific Physical Broadcast Channel (PBCH) transmission from the eNB.

18. The apparatus of claim 14,
wherein the one or more processors are to process a set of Extended Physical Downlink Control Channel (xPDCCH) transmissions for one of the service-specific resource partitions from the eNB; and
wherein the set of xPDCCH transmissions include one or more of: a Resource Block type of the service-specific resource partition; a resource allocation of the service-specific resource partition; or a quasi-collocated partition-specific Channel State Information Reference Signals (CSI-RS) configuration.

19. The apparatus of claim 14,
wherein the one or more processors are to process a primary resource partition request transmission from the eNB; and
wherein the primary resource partition request transmission includes one or more of: a Resource Block type of the service-specific resource partition; a Synchronization Signal (SS) ID defining a partition ID; a supported degree of Physical Broadcast Channel (PBCH) coverage extension; a resource allocation for SS and PBCH transmissions; or a partition-specific Channel State Information Reference Signals (CSI-RS) configuration.

20. A UE device comprising an application processor, a memory, one or more antennas, a wireless interface for allowing the application processor to communicate with another device, and a touch-screen display, the UE device including the apparatus of claim 14.

21. Machine readable storage media having machine executable instructions that, when executed, cause one or more processors to perform an operation comprising:
- establish, for a User Equipment (UE), a Radio Resource Control (RRC) Connection with an Evolved Node-B (eNB);
- generate a partition support transmission for the eNB listing one or more service-specific resource partitions supported by the UE within a wireless cellular communications system bandwidth;
- process a partition configuration transmission configuring the one or more service-specific resource partitions;
- process a first plurality of Physical Broadcast Channel (PBCH) transmissions from the eNB at a first rate of repetition when under a first degree of coverage extension; and
- process a second plurality of PBCH transmissions from the eNB at a second rate of repetition when under a second degree of coverage extension,
- wherein the second degree of coverage extension is greater than the first degree of coverage extension, and the second rate of repetition is greater than the first rate of repetition.

22. The machine readable storage media of claim 21,
wherein the one or more service-specific resource partitions has a resource-block definition that differs from a legacy LTE resource-block definition with respect to at least one of: a subcarrier spacing, a Transmission Time Interval (TTI), a number of Orthogonal Frequency Division Multiplexing (OFDM) symbols per TTI, a number of subcarriers per Resource Block (RB), a bandwidth per RB, a number of Resource Elements (REs) per RB, or a cyclic prefix length.

23. The machine readable storage media of claim 21, wherein the one or more service-specific resource partitions are secondary partitions, the operation comprising:
- process a System Information Block (SIB) transmission from the eNB, the SIB transmission including resource allocation information about at least one of the secondary partitions.

24. The machine readable storage media of claim 21, the operation comprising:
- process a resource-partition-specific Physical Broadcast Channel (PBCH) transmission from the eNB.

* * * * *